July 21, 1942.  W. L. SEARLES  2,290,714
ELEVATOR DISPATCHING SYSTEM
Filed Oct. 24, 1940  8 Sheets-Sheet 1
Fig. 1.
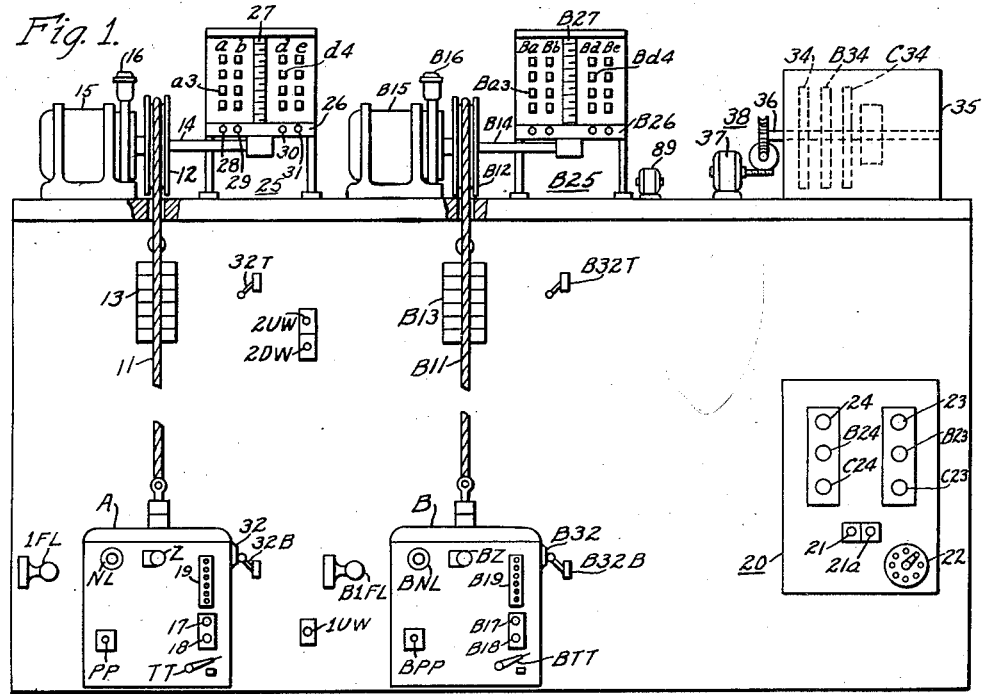
Fig. 2.
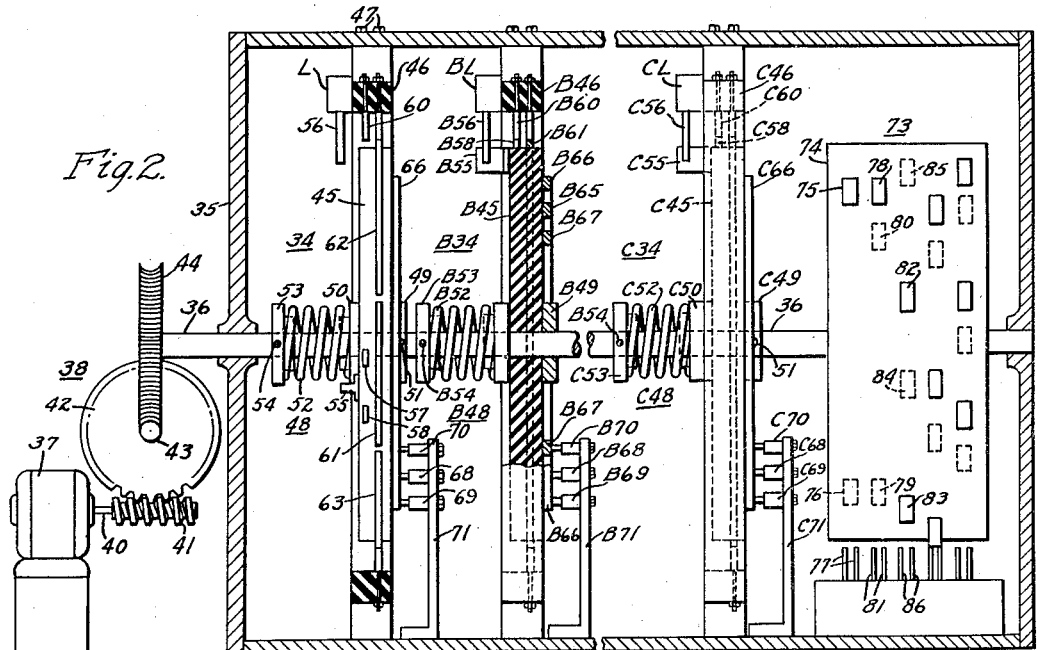
Fig. 3.
WITNESSES:
Leon M. Garman
Birney Himes
INVENTOR
William L. Searles.
BY
ATTORNEY July 21, 1942.  W. L. SEARLES  2,290,714
ELEVATOR DISPATCHING SYSTEM
Filed Oct. 24, 1940   8 Sheets-Sheet 2

WITNESSES:
Leon M. Garman
Birney Hines

INVENTOR
William L. Searles.
BY
ATTORNEY

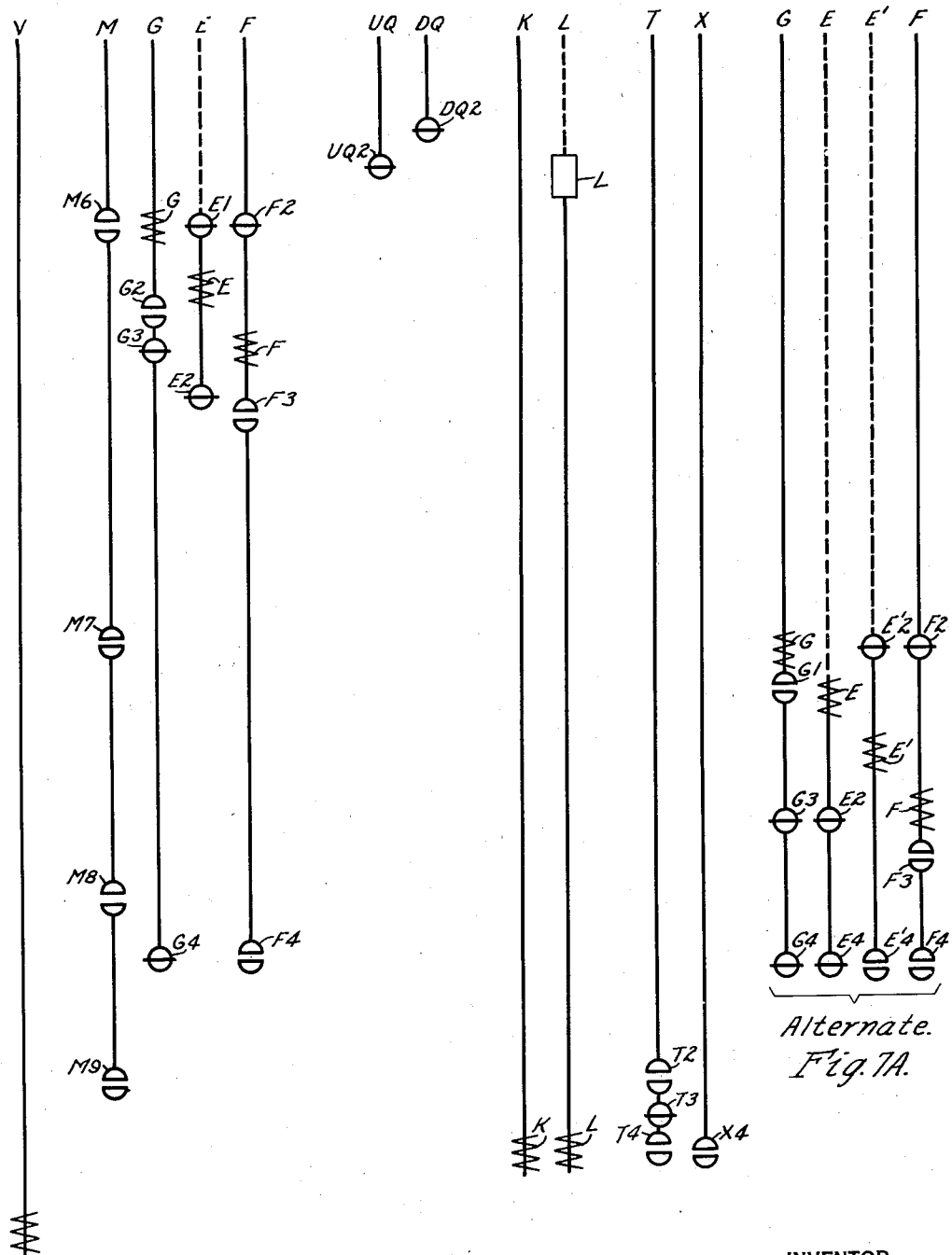

July 21, 1942.  W. L. SEARLES  2,290,714

ELEVATOR DISPATCHING SYSTEM

Filed Oct. 24, 1940  8 Sheets-Sheet 8

WITNESSES:
Leon M. Garman
Burney Hines

INVENTOR
William L. Searles.
BY
ATTORNEY

Patented July 21, 1942

2,290,714

UNITED STATES PATENT OFFICE 2,290,714

ELEVATOR DISPATCHING SYSTEM

William L. Searles, Plainfield, N. J., assignor to Westinghouse Electric Elevator Company, Jersey City, N. J., a corporation of Illinois Application October 24, 1940, Serial No. 362,579

32 Claims. (Cl. 187—29)

My invention relates to elevator dispatching systems, and more particularly to automatic dispatching systems for use in buildings having a large number of elevators and a large volume of traffic.

The invention is suitable for application to any elevator system which is required to give regular elevator service as opposed to a system which merely has cars operating on call to stand idle unless calls are registered.

It is particularly suitable to buildings of such character that the traffic demands are often so irregular that a large number of calls for service may be registered during a short space of time followed by a lull during which very few calls are registered. Under these conditions, it is very difficult to adjust the interval between cars in an elevator eystem, so that all floors will be properly served. During a light traffic period, the elevators will tend to make very rapid progress from one terminal to the other with a consequent accumulation of cars at the terminals. Then if a large number of calls are registered almost simultaneously, those farthest from the terminals will have very long waits. If an attempt is made to dispatch several cars at once from the terminals to answer the calls, there will be a duplication of stops when more than one car will answer the same call. There is also a continued accumulation of the cars at the terminals unless some cars are passed through the calls registered. In this case, the service of the cars passed through is lost for that trip.

These complications lead to inefficiency in the operation of the elevator system which it is the object of my invention to overcome by dispatching the cars at regular intervals. These intervals are determined by the traffic demand obtaining at each instant as indicated by the operation of the cars themselves.

One object is to correlate the elevator service with the requirement for service or traffic demand.

A further object of my invention is to make each car tend to conform to the average schedule of all the cars as set up by their operation and the traffic demand by dividing the registered calls between the cars so that each will handle about the same amount of traffic in proportion to the number of cars in service and the traffic demand at that time.

Another object of my invention is to totalize the round trip running time of each car at every instant and obtain the average round trip running time for all cars in the system.

Another object of my invention is to divide the average round trip running time of all the cars by the number of cars in service to obtain the proper interval of dispatch to suit the instantaneous traffic demand conditions obtaining at any instant.

Another object of my invention is to cause any car in the system to pass a call or calls when it is desirable to do so in order to have this car conform to the average round trip running time of itself and the other cars.

A still further object of my invention is to cause any car to slow down automatically in order to have this car conform to the average round trip running time of itself and the other cars.

Another object is to divide the registered calls among the several cars so that all of them will be about equally loaded in point of number of stops, thus preventing any bunching because of one or two cars being excessively delayed.

Another object is to cause the loading car of those which may be headed toward a group of registered calls to advance faster than it normally would, and to cause the next following car to be retarded more than it otherwise would be.

It is a further object to so control the speed of each car that there will be a tendency for its round trip time to conform to the average of all the cars.

It is a still further object to regulate the speed of all the cars in the system in accordance with the traffic demands in such a way that the dispatching interval will decrease when the traffic load becomes light and will increase when the traffic load becomes heavy.

It is an object to provide for advancing each car towards a desired position in the event that it falls behind that position and to simultaneously lengthen the time interval to the next dispatching signal.

A similar additional object is to provide for retarding any car getting ahead of its desired position and for simultaneously shortening the interval to the next dispatching signal.

It is a still further object to provide a dispatching system that will keep the cars in a predetermined order, and one which is flexible enough to permit the selection of any desired number of cars for operation.

It is another object to slow down the scheduling mechanism for all cars if one or more cars get behind time and to speed up the scheduling mechanism of all cars when one or more cars get ahead of time.

It is an object, in the event that a car gets behind its scheduling mechanism, to simultaneously lengthen the dispatching interval for the next car to be dispatched, to prevent the said late car from responding to registered calls, and to require a slower schedule for all cars in service by slowing down the scheduling mechanisms for all of the cars.

A similar further object, in the event that a car gets ahead of its scheduling mechanism, is to simultaneously shorten the dispatching interval for the next car to be dispatched in order to slow down the said early car so that it does not advance so fast, and to require a faster schedule for all cars in service by speeding up the scheduling mechanisms for all the cars.

Other objects of my invention will, in part, be obvious and will, in part, appear hereinafter.

For a better understanding of the invention, reference may be had to the accompanying drawings, in which:

Figure 1 is a diagrammatic representation of an elevator installation embodying my invention;

Fig. 2 is a view in front elevation of a dispatching mechanism comprising a plurality of car scheduling disks and a dispatching timer for use in the elevator system illustrated in Fig. 1, parts of the frame and the mechanism being broken away to illustrate the interior arrangement thereof;

Fig. 3 is a view in side elevation of a small portion of one of the car scheduling disks, and two pairs of contact brushes to be engaged by contact segments on the disk when it is in its dispatching floor position;

Figure 4:
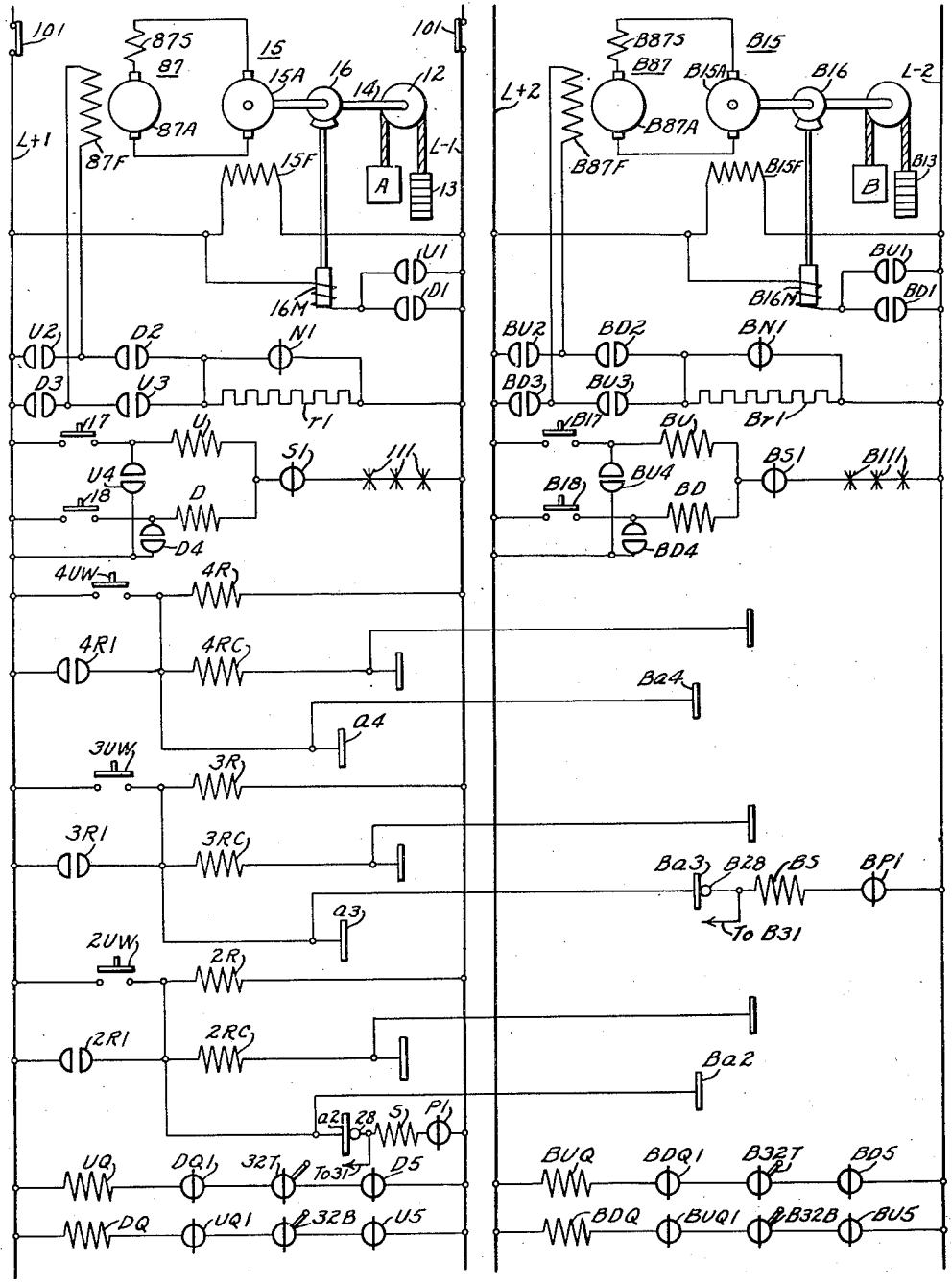
Figure 4A:
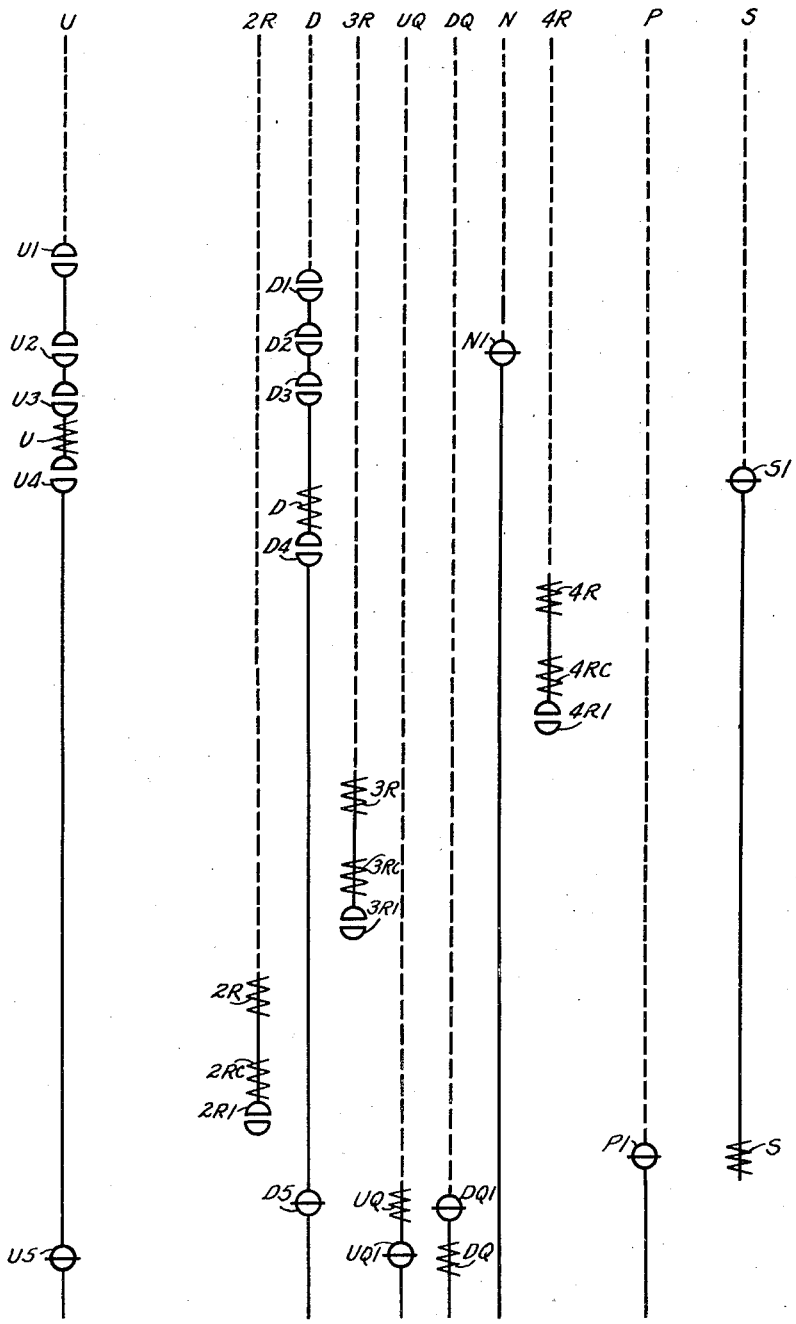
Figure 5:
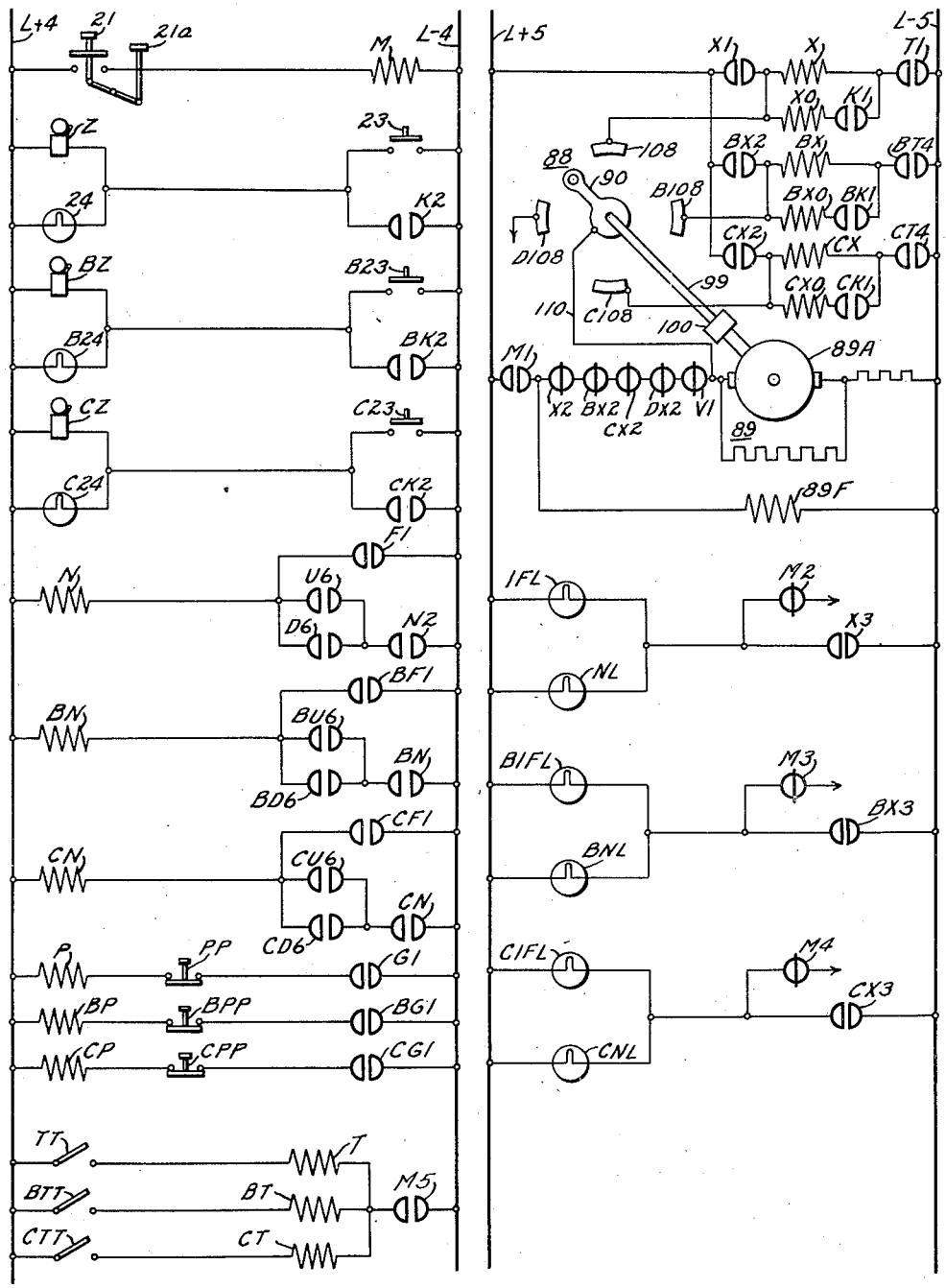
Figure 5A:
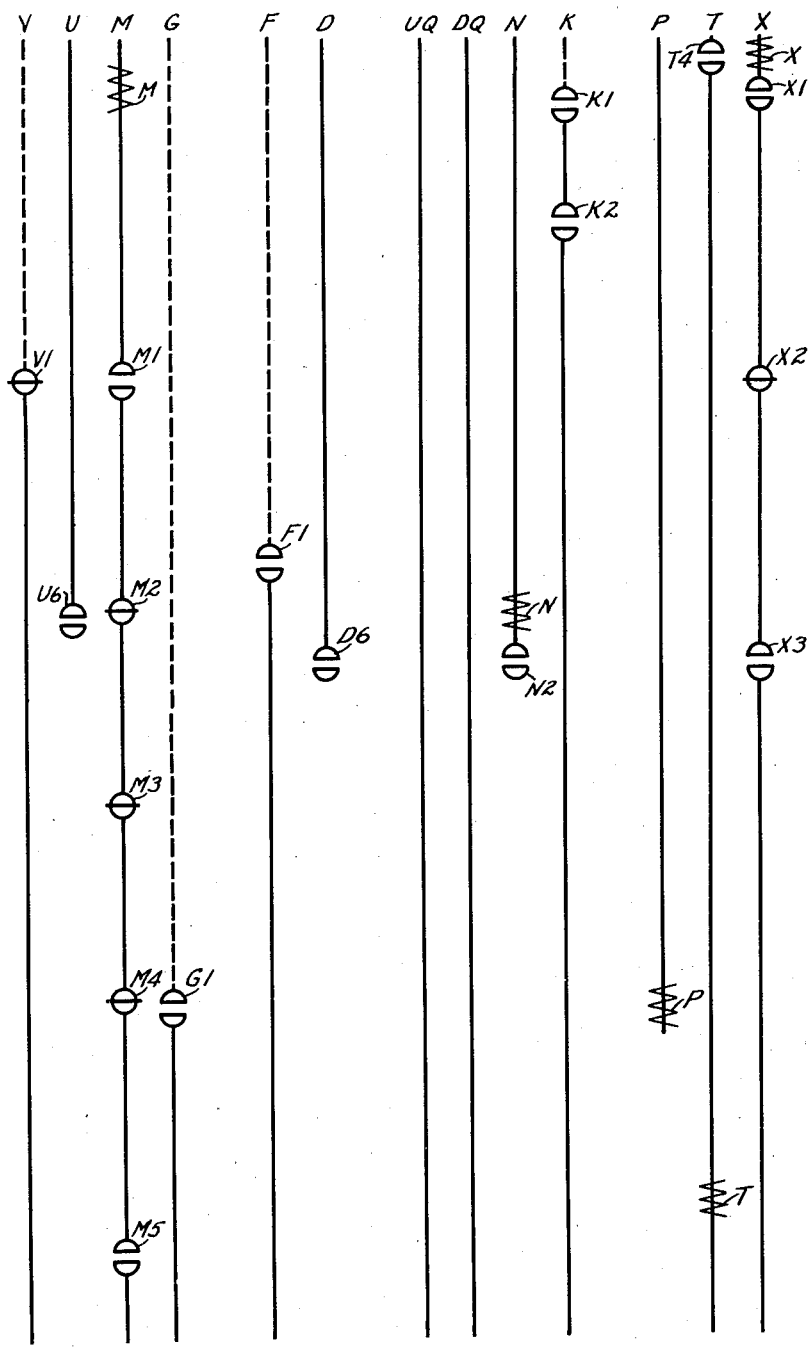
Figure 6:
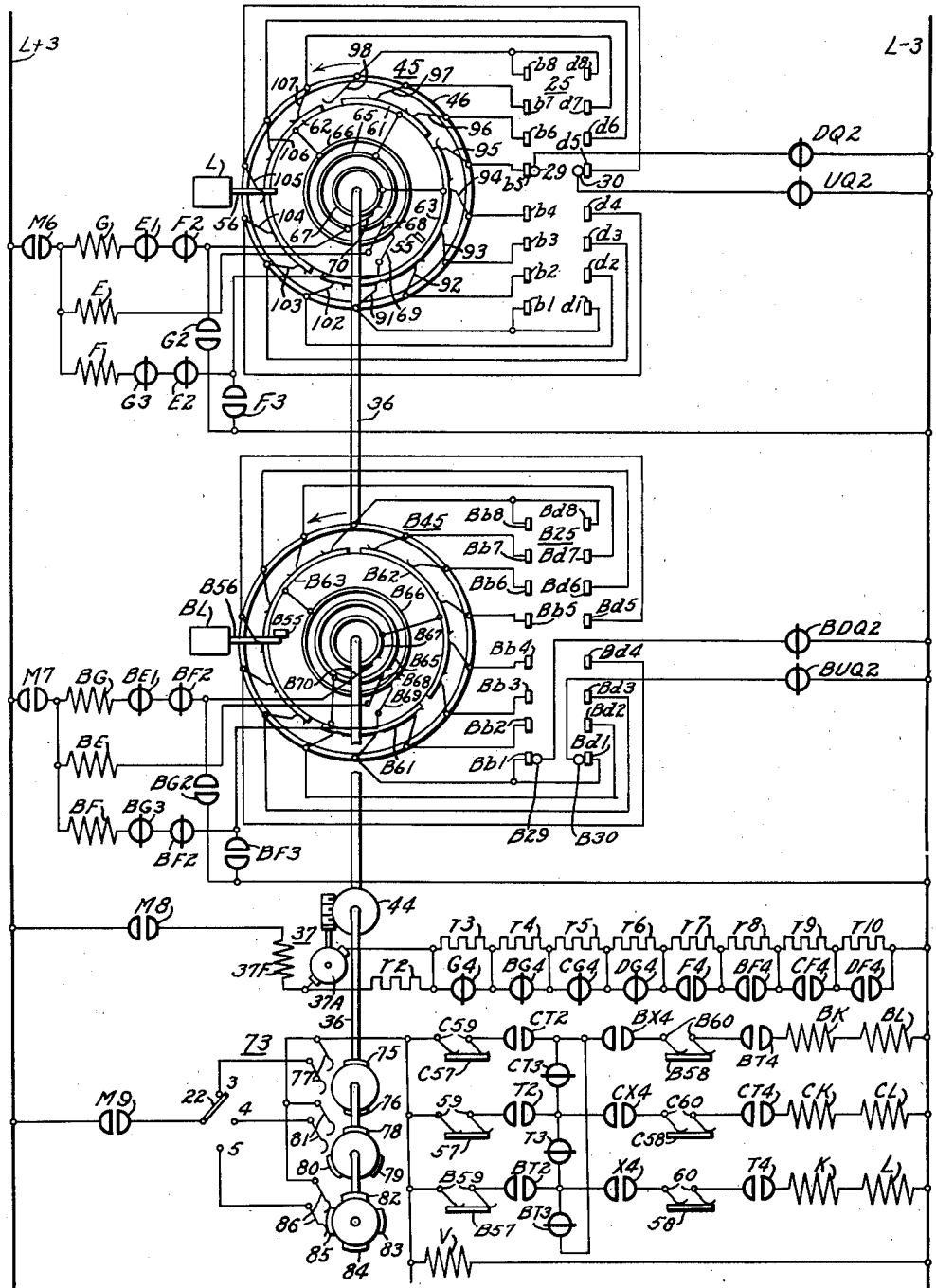
Figure 7:
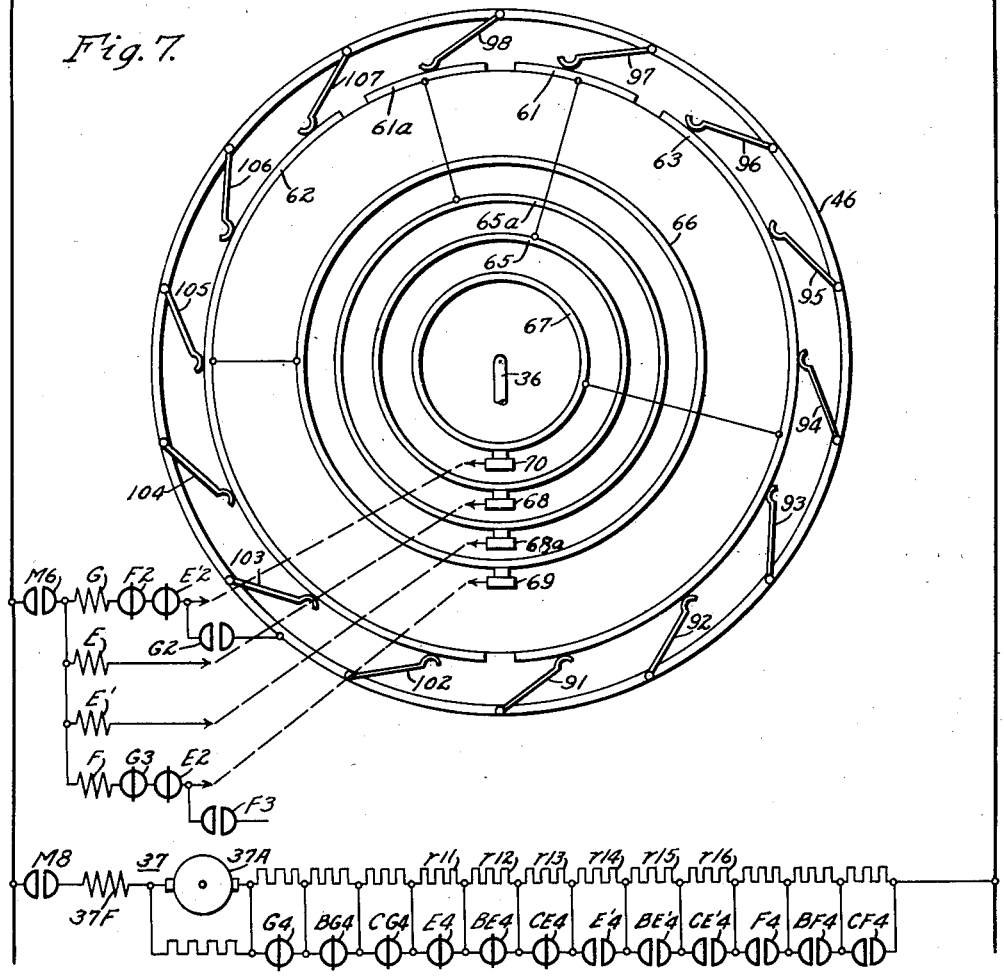
Figure 8:
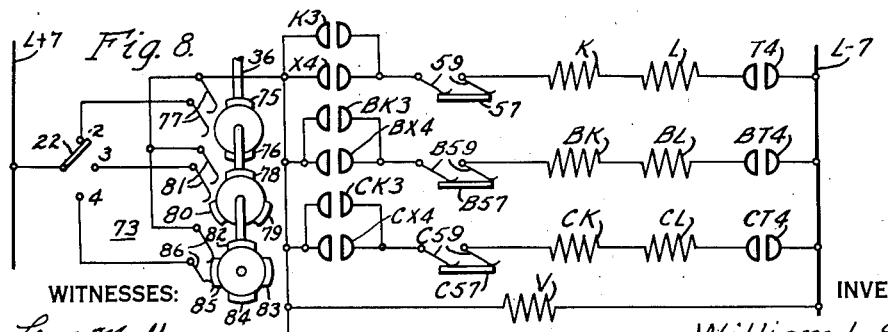

Figs. 4, 5, and 6 collectively constitute a straight line diagram of the control system and the dispatching system of the elevator system illustrated in Fig. 1;

Fig. 7 is a diagrammatic representation in straight line style of a modified form of one of the car scheduling disks shown in Fig. 2 and the circuits closed and opened thereby when it is in operation; and Fig. 8 is a modified arrangement of the dispatching relay circuits which may be substituted for the circuits of the dispatching relays shown in the lower part of Fig. 6.

Figs. 4A, 5A, 6A, and 7A provide a key representation of the relays and switches embodied in Figs. 4, 5, 6, and 7, illustrating the coils and contact members of the relays disposed in horizontal alignment with their positions in the straight line circuits so that the locations of the relay coils and contacts may be readily determined when the sheets are placed side by side. By reason of the large number of duplicate relays, the Figs. 4A, 5A, 6A, and 7A do not show stems or shafts for all relays. However, they show those for one or two cars at least and from these the position and number of corresponding contact members and coils may be easily ascertained.

For convenience, the relays as identified by their coils in the diagrams have been given the following designations:

U = up direction switch for car A
D = down direction switch for car A
R = call registering relay
RC = call cancelling coil
S = stopping relay for car A
UQ = up direction conditioning relay for car A
DQ = down direction conditioning relay for car A
F = car-ahead-of-time relay for car A
E = car-on-time relay for car A
G = car-behind-time relay for car A
M = master switch for starting and stopping dispatching system
N = speed control relay for car A
P = by-pass relay car A
T = car-in-service relay for car A
X = "next" relay for car A
XO = next cancelling coil for car A
K = "start" relay for car A
L = schedule disk releasing relay for car A
V = relay for stopping sequence motor
W = stop buttons at floors

*Description of Figs. 1, 2, and 3*

Referring more particularly to Fig. 1, I have illustrated an elevator system embodying two cars A and B, but reference will be made in the description of the apparatus to additional cars, and it is to be understood that the invention may be used with any desired number of cars.

The car A may be suitably suspended in its hatchway by a cable 11 which passes over a hoisting drum 12 to a counterweight 13. The hoisting drum 12 is mounted on a shaft 14 for operation by a hoisting motor 15 controlled by an electromagnetic brake 16. The car B may be suspended in a similar manner in position to be operated by a hoisting motor B15.

Where the cars and their control systems are similar, only car A will be described and the same parts for car B will be given the same reference numerals with the prefix B. Where a third car C is introduced it will also be given the same numerals with the prefix C.

An up starting button 17 and a down starting button 18 are disposed in the car to enable the attendant to start it in the desired direction.

A plurality of stop buttons 19, one for each floor, are mounted in car A. When the attendant desires to stop the car at a floor ahead, he presses the button for that floor to cause the car to stop automatically thereat, but it is to be understood that my invention may be used with any other system of control, as by a car switch.

An "up" button 1UW is mounted at the lower landing and an "up" button and a "down" button are disposed at each intermediate landing so that waiting passengers may register stop calls for the cars to cause the nearest approaching car to stop at their landing. The stop buttons at the second floor are designated as 2UW for the "up" direction and 2DW for the "down" direction. The stop buttons at the floor landings are common to all the cars.

A floor lantern 1FL is provided at the first floor landing for car A to indicate to waiting passengers when that car is ready to start on an "up" trip. A similar first floor lantern B1FL is provided for car B and it is to be understood that each additional car will have its own floor lantern.

Each car is provided with a "next" signal device such as the lamp NL in car A to warn the attendant thereon to get ready for a dispatching signal to leave the floor.

A dispatching signal device such as a buzzer Z in car A is provided for each car so that the attendant thereon may be given a dispatching signal to start after he has received a "next" signal.

A car-in-service switch TT is mounted in car A so that the attendant in that car may, by closing that switch, place his car in service to receive the usual dispatching signals and to cause it to be controlled by the dispatching system. A similar switch is mounted in each of the other cars for the same purpose.

A by-pass button PP is disposed in car A to enable the attendant thereon to cause his car to refuse to by-pass stop calls when it is behind time.

The car A is provided with a cam 32 for closing a top limit switch 32T and a bottom limit switch 32B to control an up relay UQ and a down relay DQ shown in Fig. 4.

A dispatching attendant's control panel 29 is mounted at the first floor, which will be assumed to be the dispatching floor in connection with the present system. The panel contains a push button 21 for starting the dispatching system in operation and a push button 21A for shutting it down so that the dispatching attendant may start or stop the dispatching mechanism as he desires.

The panel also has a switch 22 by means of which the dispatching system may be "set" for the number of cars to be operated.

An individual "start" button for each car is mounted on the panel 29 so that the dispatching attendant may operate the starting buzzer in any car to cause that car to be dispatched promptly regardless of the operation of the dispatching mechanism. The dispatching button for car A is designated by the reference numeral 23, that for car B as B23 and that for car C as C23.

The panel also embodies a signal lamp for each car to indicate to the dispatching attendant when that car receives its start signal. The start signal lamp on the panel for car A is designated by the numeral 24, the one for car B as B24 and the one for car C as C24.

Each of the cars is provided with an actual position floor selector and a desired-position floor selector. The actual position selector for car A (Fig. 1) is designated by the numeral 25 and that for car B by the reference B25. The desired-position selector for car A (Fig. 2) is designated by the numeral 34, that for car B as B34, and that for car C as C34. The actual position selectors are provided for connecting the circuits for the floors served by the cars in accordance with the position of the cars.

The actual position floor selector 25 for car A comprises a selector arm 26 mounted on a screw shaft 27 in position to move a plurality of brushes 28, 29, 30, and 31 over a plurality of rows of stationary contact segments. The "up" brush 28 engages the "up" stopping contact segments under the letter a, and the "down" brush 31 engages the "down" stopping contact segments under the letter e. Each row of contact segments comprises one segment for each floor and each segment will be designated by the small letter for its row with the floor numeral affixed thereto. For instance, the "up" stopping segment for the third floor is a3.

The actual position floor selector is also provided with a plurality of "up" scheduling contact segments under the letter b and a plurality of "down" scheduling contact segments under the letter d for connecting certain scheduling circuits in a manner to be hereinafter described. There is one "up" and one "down" contact segment for each floor and each will be designated by the number of its floor and the letter of its row. For instance, the "down" scheduling segment for the fourth floor for car A is d4.

The screw shaft 27 is connected for operation by the hoisting motor shaft 14 so that the brush arm 26 will travel over the contact segments exactly in accordance with the movement of the car, that is, when the car is at any floor the selector arm 26 will cause its brushes to engage the contact segments to close such circuits for car A as should be closed when the car is at that floor.

The desired-position selectors for the cars are housed in a frame 35 and are operated independently of the cars by a shaft 36 rotatably mounted in the frame and driven by a motor 37 through a speed reducing mechanism 38. The speed reducing mechanism comprises a shaft 40 driven by the motor 37 and a worm shaft 41 mounted on the shaft 40 in position to mesh with a worm wheel 42 which drives a worm shaft 43 meshing with a worm wheel 44 fixedly mounted on the outer end of the shaft 36. The motor 37 is a constant speed motor for causing the shaft 40 to rotate at a predetermined constant speed. However, the motor is provided with a plurality of resistors by means of which it may be conditioned to run at either higher or lower predetermined constant speeds when the operation of the cars demands it.

The desired-position selector or scheduling device 34 for car A (Fig. 2) comprises a disk 45 rotatably mounted on the shaft 36 within a brush ring 46 fixed in the frame 35 by a plurality of bolts 47. The ring 46 is broken away to disclose the disk 45; the ring B46 and part of the disk B45 for car B are broken away to disclose their inner construction, while the ring C46 for car C is shown complete with the disk C45 in dotted outline therein.

A friction clutch 48 is provided for causing the disk 45 to start rotating with the shaft 36 when the car A receives a "start" signal for scheduling the desired position of the car. The clutch comprises a circular fixed plate 49 and a clutch plate 50. The plate 49 is mounted on shaft 36 at one side of the disk and is fixed to the shaft by a setscrew 51. The clutch plate 50 is slidably mounted on the shaft on the other side of the disk and is biased against the disk by a coiled compression spring 52. The spring is disposed concentrically on the shaft and is held in compression against the clutch plate by a collar 53 fixed on the shaft by a setscrew 54. Inasmuch as the disk 45 is disposed between the spring pressed clutch plate and the fixed plate, the friction of these plates on the sides of the disk will cause the disk to rotate with the shaft unless prevented by a holding means.

The means for holding the disk 45 from rotation while car A is awaiting a "start" signal is a stop plate 55 mounted on the left-hand side of the disk in position to be engaged by a stop arm 56 mounted on the ring 46 and controlled by an electromagnet L. Each of the disks for the other cars is mounted between a clutch plate and a collar in the same manner so that they will rotate with the shaft except when they are forceably held against such rotation.

When the electromagnet L is energized it withdraws the arm 56 thus permitting the disk to rotate with the shaft under the action of the friction clutch. The stopping block 55 and the stopping arm 56 are so disposed that the scheduling disk 45 will be stopped when it reaches its position corresponding to the position of the car at the dispatching floor. Hence, when the electromagnet is energized to release the disk at the time the car is given a "start" signal, the disk at once starts rotation from its dispatching floor position and continues to rotate in accordance with the desired position for the car; that is, the position corresponding to the position in which the car should be, until it completes one revolution and returns to its dispatching floor position. At this point, the plate 55 strikes the arm 56 and holds the disk against rotation until the dispatching system again gives car A a "start" signal.

A pair of contact segments 57 and 58 are mounted on the periphery of the disk 45. A pair of brushes 59 are mounted on the ring 46 to engage the segment 57. A similar pair of brushes 60 are provided for the contact segment 58. The brushes 59 and 60 engage the contact segments 57 and 58 only when the disk is in its dispatching floor position for the purpose of partially completing certain circuits for certain dispatching relays to be described later.

The disk 45 is designed to electrically connect certain circuits with the contact segments $b$ and $d$ on the actual position floor selector 25 for the purpose of controlling a plurality of scheduling relays E, F and G (Fig. 6) for car A. For this reason, a car-on-time strip 61, a car-ahead-of-time strip 62, and a car-behind-time strip 63 are disposed on the periphery of the disk 45 in position to be engaged by a plurality of up strip brushes 91 to 98, inclusive, and a plurality of down strip brushes 102 to 107, inclusive, fixed on the ring. The on-time strip 61 is shorter in length than the ahead-of-time strip 62 and the behind-time strip 63, but it still long enough to span two or three of the strip brushes 91, etc.

Three contact rings 65, 66, and 67 are electrically connected to the strips 61, 62, and 63 and mounted on the right-hand side of the disk concentric with the shaft 36 in position to be in contact with cooperating ring brushes 68, 69, and 70 mounted in a brushholder 71 which is bolted to the frame 35. The brushes slide along the rings as the disk rotates and thereby maintain electrical connection with the contact strips 61, 62, and 63 on the rim of the disk.

These strips, rings, and brushes cooperate to complete a circuit for energizing either the "on time" relay E, or the "ahead-of-time" relay F or the "behind-time" relay G for car A shown in Fig. 6, in accordance with that car being on time, ahead of time, or behind time, as determined by its desired position selector.

An impulse giving mechanism 73 for the dispatching system (common to all the cars) is provided for giving dispatching impulses at regular intervals to cause the cars to receive "start" signals at regular intervals. The impulse mechanism comprises an impulse drum 74 fixed on the right-hand end of the shaft 36 to be rotated thereby, thus insuring the rotation of the impulse drum at the same rate of speed as the desired position disks.

A plurality of rows of conducting bars or cams are mounted on the outer cylindrical surface of the drum. Each row extends around the drum and corresponds to a particular number of cars in operation in the system. The row for use when three cars are being operated comprises two cams designated as 75 and 76. They are equally spaced apart and are disposed in line with each other around the drum in position to be wiped by a pair of stationary contact brushes 77 mounted on the frame 35 as the drum is rotated. A similar row of contact cams 78, 79, and 80 are mounted on the drum to engage a pair of brushes 81 when four cars are being operated. A similar set of cams 82, 83, 84, and 85 and a pair of brushes 86 are provided for five cars. As many rows of cams may be provided as are needed to take care of the number of cars served by the dispatching system. The brushes of each pair are electrically connected in a circuit (shown in Fig. 6) so that a cam sliding over them can complete that circuit to give a dispatching impulse.

By means of the switch 22 on the dispatching panel, the dispatching attendant may select the right row of cams for the number of cars to be placed in service, as shown in the lower part of Fig. 6. The two cam row will be used when three cars are in service because it is assumed that one car is always at the dispatching floor in this system, and that only two cars will be given dispatching impulses during the round trip time of one car. Similarly, the three cam row will be used when four cars are to be placed in service, etc.

Description of Fig. 4

The invention may be used in connection with any suitable elevator control and signalling system such for instance as that illustrated and described in the Frank E. Lewis Patent No. 2,005,899, issued June 25, 1935, for an elevator control and signalling system, and Fig. 4 illustrates broadly a control system of that nature which may be used to operate the cars. If a more detailed information is desired regarding the control system, reference may be had to the Lewis patent.

In the control system for car A, as shown in Fig. 4, the hoisting drum 12 is directly coupled by the shaft 14 to the armature 15A of the hoisting motor 15, the field winding 15F of which is connected, for constant voltage energization, to a source of supply designated by the supply conductors L+1 and L—1.

A variable voltage system of control is provided for operating the hoisting motor 15 wherein its armature 15A is connected in closed circuit with the armature 87A of a generator 87. The generator is provided with a separately excited field winding 87F and a cumulative series field winding 87S. The armature 87A of the generator may be driven by any suitable motor (not shown). The electro-magnetic brake 16 is operated by a brake magnet 16M. The brake magnet 16M is energized to release the brake 16 when the car is running and is deenergized to apply the brake when the supply of power to the car is cut off.

The operation of the hoisting motor 15 and its direction of rotation may be controlled by controlling the connection and the direction of the excitation current that is supplied to the separately excited field winding 87F of the generator. The connection and the direction of the excitation current may be controlled by means of an up-direction switch U and a down-direction switch D. The up-direction and down-direction switches are controlled by the up-starting button 17 and the down-starting button 18, by means of which the car attendant may cause the car to start in either direction.

Any suitable system may be employed for causing the cars to stop at the floors when one of the hall buttons (2UW, etc.) is operated or when one of the car buttons 19 is pressed such as the system described in the above-mentioned Lewis patent. When a stop call is registered by the operation of a hall pushbutton, it causes a stopping segment on the floor selector of each car to be energized. Each car is provided with a stopping relay, and the next available car for registered stop, in approaching that stop, causes its stopping brush to engage the energized stopping segment and thereby energizes its stopping relay. The energized stopping relay then effects the automatic stopping of the car at the floor at which the stop call was registered. The stopping relay in the above-named patent for car C is designated as 7Y.

In Fig. 4, I have shown a small portion of such a car stopping system by indicating the up call registering or call storing relays, disposed to be energized by the operation of the up pushbuttons 2UW, 3UW, etc., and thereby register or store up calls for stops at the floor landings until the cars answer them. A cancellation coil is provided for cancelling the call registered or stored on each relay when a car stops at the floor of that relay in answer to the call registered thereon. The call registering relays are indicated as 2R for the second floor, 3R for the third floor and 4R for the fourth floor. The cancellation coils are designated as 2RC, 3RC, and 4RC. The call registering relay 2R controls a pair of contact members 2R1 for establishing a self-holding circuit for itself and for energizing the stopping segments $a2$ and $Ba2$ on the actual floor selectors for cars A and B. No stopping segments are shown for the other cars as it is believed that the two segments shown will be sufficient to illustrate the system.

The car A is provided with a stopping relay S electrically connected to its up stopping brush 28 and its down stopping brush 31 so that when one of its stopping brushes engages an energized stopping segment, its stopping relay will be energized to effect the stopping of the car at the floor of the energized stopping segment. A similar stopping relay is provided for each of the other cars. No circuits are shown for the stop buttons in the cars because such circuits are old and well known in the art. They are also shown in the above-mentioned patent.

An up relay UQ and a down relay DQ are provided for controlling the electrical connection of the brushes on the actual position selector shown on Fig. 6 for car A in accordance with the direction of operation of the car. The energization of these relays is controlled by the up and the down direction switches U and D and by the limit switches 32T and 32B shown in Fig. 1, so that the relays will be reversed when the car is reversed or when it arrives at a terminal.

Description of Fig. 5

A master dispatching relay M is illustrated in Fig. 5 for starting the dispatcher and the desired-position selectors in operation and for stopping their operation. This relay is energized by the button 21 and deenergized by the button 21a on the dispatcher's panel 20.

The circuits for the "start" buzzers Z, BZ, and CZ in the cars and the "start" lamps 24, B24, and C24 on the dispatcher's panel are given in the upper left-hand corner. The "start" buzzer and the "start" lamp for car A have two parallel controlling circuits, one of which may be energized by the "start" button 23 on the dispatcher's panel and the other of which may be energized by the "start" relay K for car A shown in Fig. 6. The circuits for the "start" buzzers and the "start" lamps of the other cars are similar.

A plurality of slow-down relays are provided for changing the speed of the cars when they fail to run according to the desired schedule. The slow-down relays control the resistors $r1$, $Br1$ etc., in the circuits of the generators 87, B87, etc. The slow-down relay for car A is designated by the letter N, that for car B as BN and that for car C as CN. The slow-down relays are controlled by the car-ahead relays F, BF, etc., shown in Fig. 6 so that, if a car gets too far ahead of its schedule as indicated by its desired position selector, its resistor will be inserted in its generator field winding circuit to slow down the car.

A plurality of by-pass relays are provided by which the cars, when behind time, will be caused automatically to by-pass stop calls registered at the landings. The by-pass relay for car A is designated by the letter P, that for car B as BP, and that for car C as CP. The by-pass relays are controlled by the car-behind-time relays (G, BG, etc.) in Fig. 6 which energize them when the cars get behind their schedule and thus cause them to by-pass registered calls until they catch up with their on-time positions. The by-pass buttons PP, etc., mounted in the cars enable the attendants to prevent operation of the by-pass relays when they desire.

A plurality of car-in-service relays are provided for operation by the car-in-service switches TT, BTT, etc., in the cars. The car-in-service relay for car A is designated as T, that for car B as BT, and that for car C as CT. Each of these relays, when energized, closes certain circuits to place its car under the dispatching and scheduling system.

The circuits for the first floor lanterns IFL, BIFL, etc., are given in the lower right-hand corner of Fig. 5 and are controlled by the operation of the "next" relays indicated in the upper right-hand corner. When the relay M is deenergized to stop the dispatching system, the lamps for each car are connected to its actual floor selector contact segments by the closing of the contacts M2, M3, M4, etc. These circuits are not shown completely because they are old and well known.

The "next" relays are designated by the letter X for car A, BX for car B, and CX for car C. The "next" relays are controlled by the dispatching relays (K, BK, etc., of Fig. 6) and a sequence switch 88 operated by a sequence motor 89. When a "next" relay is energized, it lights the first floor lantern and the "next" lamp associated with its car.

Each of the "next" relays is provided with a cancellation coil, that for relay X being indicated by XO; that for car B by BXO; and that for car C by CXO. When a cancellation coil is energized while a "next" relay is energized, it neutralizes the effect of energization of the "next" relay and causes it to become deenergized. The energization of the cancellation coils is effected by the "start" relays K, BK, etc.

The sequence switch 88 comprises a switch arm 90 having its one end mounted on a shaft 99 and its other end disposed to sequentially engage a circle of contacts, one for each "next" relay. The contact leading to the "next" relay X for car A has the reference numeral 108, that for car B the numeral B108, and for car C the numeral C108. The contact D108 represents contacts for additional cars which may be added.

The motor 89 rotates the shaft 99 through a gear reducing unit 100 and is provided with a field winding 89F and an armature 89A. The field winding is controlled by the master switch M of the dispatching system so as to be energized only when the dispatching system is in operation. The armature is controlled by certain contacts of the "next" relays and the relay V of Fig. 6. Only one "next" relay is energized at a time and when it is deenergized, it closes back contacts to start the motor and its arm 90 to find the contact of the "next" relay for the next car to start. As soon as the switch arm finds and selects the contact of the "next" relay, that relay is energized and opens its back contacts to stop the motor. In practice, the motor rotates the arm 90 over the contacts until it comes to the contact of a "next" relay for which a circuit has been prepared by a starting relay, then it is stopped but its drift after it stops carries the arm off of the energized contact and toward the next contact but not far enough to engage the next contact. Thus, when the motor comes to a standstill, the switch arm is disposed between the contacts and remains there until the motor is started again.

*Description of Fig. 6*

The circuits for the dispatching or starting relay K for car A, BK for car B and CK for car C are shown in the lower part of Fig. 6. Under predetermined conditions, the circuits are temporarily energized by the action of the impulser 73 of Fig. 2 for the purpose of causing the start buzzers of the cars to be energized at the desired intervals and for deenergizing the "next" relays of the cars when they are given start signals. The circuits of the starting relays are prepared for energization by front contacts of the "next" relays, by front contacts and by back contacts of the car-in-service relays, and by the contact segments on the desired-position disks, and are completed by the cams on the impulser. The starting relay for a car can be energized by the impulser only when its desired-position disk is in its dispatching floor position, its "next" relay has been energized and the desired-position disk of the following car is in its dispatching floor position.

The front and back contacts of the car-in-service relays are included in the circuits of the dispatching relays so that any one of the cars may be taken out of service without interfering with the energization of the dispatching relays to effect the giving of starting signals to the next cars to be started from the dispatching floor.

The electromagnetic coils L, BL, CL for releasing the limit arms 56, B56, etc., of the desired-position selectors are included in series with the dispatching relays K, BK, and CK, respectively, so that the limit arm on the desired-position selector of a car will release its desired position disk at the time the dispatching relay for that car is energized to cause the buzzer of that car to give it a dispatching signal.

The upper part of Fig. 6 gives the circuits for the scheduling relays comprising the car-on-time relay E, the car-ahead-of-time relay F and the car-behind-time relay G of car A and similar relays for car B. As shown, the on-time relay E of car A is electrically connected to the on-time brush 68 on the ring 65 of the desired position disk of car A, the ahead-of-time relay F is electrically connected to the ahead-of-time brush 69 on the ring 66, and the behind-time relay G is electrically connected to the behind-time brush 70 on the ring 67. The on-time ring 65 is electrically connected to its cooperating on-time contact strip 61, the ahead-of-time ring 66 is electrically connected to its cooperating ahead-of-time contact strip 62, and the behind-time ring 67 is electrically connected to its cooperating behind-time contact strip 63. Each of the up strip brushes 92 to 97, inclusive, is electrically connected to an up position selector contact segment for one floor on the actual position floor selector 25 of car A. Each of the down strip brushes 102 to 107 is electrically connected to a down contact segment for one floor. The lower terminal brush 91 is electrically connected to the contact segments for the lower terminal and the upper terminal brush 98 is electrically connected to the contact segments for the upper terminal. Hence, as the desired-position disk rotates while the car moves the actual position brushes 29 and 30, the scheduling relays E, F, and G are energized in accordance with the car being on time, ahead of time, or behind time. For instance, when the car is behind time at the fifth floor, while going up, the desired-position disk has rotated to a point where the behind-time strip 63 is engaged by the brush 95 connected to the up actual position contact segment b5 for the fifth floor which are engaged by the brush 29, thus completing a circuit for energizing the behind-time relay G, while the on-time strip 61 and the ahead-of-time strip 62 are connected to floor segments out of contact with the brush 29.

The circuit for the motor 37 for rotating the desired-position selector disks and the dispatching impulser is given below the circuits for the scheduling relays in Fig. 6. The motor may be a series wound constant speed motor having an armature 37A and a field winding 37F.

A plurality of resistors $r3$ to $r10$, inclusive, are disposed in the circuit of the armature 37A for controlling the speed of the motor. The resistors $r3$ to $r6$ are normally short circuited by back contact members operated by the behind-time relay G, BG, etc. When a car falls behind its schedule position, its behind-time relay is energized to open its contacts in the impulse motor circuit and thereby insert its resistor in the circuit to the armature to slow down the impulse motor in accordance with the ability of the car to keep up with its schedule. The resistors $r7$ to $r10$ are controlled by front contacts on the ahead-of-time relays F, BF, etc. When a car runs ahead of its schedule, its ahead-of-time relay is energized to close its contact members in the impulse motor circuit and thereby short circuit its resistor to increase the speed of the motor in accordance with the tendency of the car to run ahead of the schedule prepared for it by its desired-position disk.

The relay V at the bottom of Fig. 6 is provided for preventing operation of the sequence motor 89 when a dispatching impulse is being given and for starting the sequence motor to hunt the "next" relay for the next car to be given a "next" signal.

*Assumed operation of the system as shown in Figs. 1, 2, 3, 4, 5 and 6*

It will be assumed that three cars A, B and C are standing at the first floor and that the main line switch 101 (Fig. 4) is closed to start the system in operation.

The closing of the main line switch energizes the field winding 15F of the hoisting motor 15 of car A and similar field windings of the other cars and they are now ready for operation. The closing of the switch energizes the up relay UQ for car A and a similar relay for each of the other cars because of the position of the cars at the first floor maintaining the limit switches 32B, etc., in open condition.

It will be assumed now that the attendant in car A closes his car-in-service switch TT to associate his car with the dispatching system and that the attendants in the cars B and C also close their car-in-service switches. It will also be assumed that the dispatching attendant sets the switch arm 22 on the panel 20 at "3" to cause the dispatching system to operate for the three cars A, B and C in service, and that he presses the button 21 on the panel 20 (Fig. 1) to start the dispatching system for the elevators. The closing of the pushbutton switch 21 energizes the master dispatching relay M by the circuit:

L+4, 21, M, L—4.

The energized relay M closes its contacts M1, M5, M6, M7, M8 and M9 and opens its contacts M2, M3 and M4. The closed contacts M1 energize the field winding 89F of the sequence motor to prepare it for operation. The open contacts M2, M3 and M4 place the control of the first floor lanterns of the cars under the "next" relays for the cars instead of under the control of the actual position floor selectors.

The closing contacts M5 complete the circuit for the car-in-service relays T, etc., which were prepared by the closing of the car-in-service switches TT, etc. The circuit for the relay T extends:

L+4, TT, T, M5, L—4.

The closing contacts M6 and M7 prepare the circuit for the desired-position floor selector disks 45, etc. (Fig. 6) for operation. The closed contacts M8 energize the impulse motor 37 by the circuit:

L+3, M8, 37F, 37A, G4, BG4, CG4, DG4, r7, r8, r9, r10, L—3.

The motor 37 now starts operation at its normal constant speed and it will rotate the desired-position disks of the cars which are not prevented from rotation and also the impulser cams at such normal constant speed as long as none of the contacts G4, etc., are opened or none of the contacts F4, etc., are closed. The motor 37 should be of such design that it will give normally a selected desirable speed which will operate the scheduling disks and the dispatching system to schedule the cars and give the dispatching signals at desired predetermined intervals.

The closing contacts M9 prepare the circuits through the selector switch 22, the impulser cams, the "start" relays K and the unlocking relays L, etc., thus completing the preparation of the dispatching system for operation in giving "start" signals to the cars and for operating the desired-position selector disks of the cars.

With the contacts M6 closed and car A standing at the first floor with its up actual position brush 29 in contact with the up contact segment b1, the on-time relay E for car A is energized by the circuit:

L+3, M6, E, 68, 65, 61, 91, b1, 29, DQ2, L—3.

Inasmuch as the other cars are standing at the lower floor, their on-time relays are also energized by similar circuits.

Returning now to the closing of the contacts M1, inasmuch as the various contacts in the circuit of the armature 89A of the sequence motor are closed, that motor is energized to start the selecting switch arm 90 in operation to pick up the "next" relay for the next car to be given a start signal. The operation of the sequence motor moves the contact arm 90 into engagement with the sequence segment 108 for car A and thereby energizes the "next" relay for car A by the circuit extending:

L+5, M1, X2, BX2, CX2, DX2, V1, 110, 90, 108, X, T1, L—5.

The energized relay X immediately closes its self-holding contacts X1 and opens its contacts X2 thereby stopping the sequence motor 89. However, the drift of the motor carries the contact arm 90 off the sequence segment 108 but not quite up to the next sequence segment. The sequence arm 90 is now at rest between the sequence segments 108 and B108. The closing of the contact members X3 of the relay X energizes the first floor lantern of car A to indicate to waiting passengers that car A will be next to leave the dispatching floor and also energizes the "next" lamp NL in car A to indicate to the attendant thereof that his car will be the next car to receive the dispatching signal to leave.

In the meantime, the impulse motor 37 has continued its constant speed rotation and has now moved the impulse cam 75 into contact with the brushes 77, thereby energizing the dispatching relay K and the disk releasing relay L for car A by the circuit:

L+3, M9, 22, 3, 77, 75, B59, B57, BT2, X4, 69, 59, T4, K, L, L—3

These energized relays cause car A to receive a dispatching signal and starts rotation of the desired-position disk 45 to indicate the desired position or schedule for car A.

The energized relay K closes its contact members K1 and K2. The closed contact members K2 energize the buzzer Z in car A to give the attendant a start signal, by the circuit:

L+4, Z, K2, L—4

The closed contact members K2 also energize the "start" lamp 24 on the dispatcher's panel to tell the dispatching attendant that car A has received its start signal. The closed contacts K1 energize the cancellation coil X9 which opposes the next relay X and causes that relay to be deenergized to open its contacts X3, thus extinguishing the first floor lantern 1FL and the next lamp NL for car A. The deenergized relay X also opens its self-holding contacts X1, opens its contacts X4 to deenergize the relay K and L and closes its contacts X2 to prepare the sequence motor for operation. The operation of the buzzer Z and the lamp 24 last only long enough to give the indications desired and are cut off promptly because of the opening of the contacts X4.

When the relay L was energized, it pulled the arm 56 away from the stopping plate 55 on the desired-position disk 45 for car A. Immediately the friction of the clutch plate 50 against the disk 45 causes the disk to rotate with the shaft 36 of the desired-position mechanism. Thus it is seen how the operation of the dispatching system, in giving a start signal to a car, releases at the same time the desired-position selector for that car and causes it to start operating to give the desired position or schedule for the car as it makes its round trip.

It may be noted that when the impulser cam 75 closed the brushes 77 and energized the relays K and L, it also energized the relay V which opened its contacts V1 in the circuit of the armature 39A of the sequence motor. It will be apparent that the relay V remains energized until the segment 75 moves past the brushes 77 and, therefore, that the sequence motor cannot restart to pick up the next car until after the impulser cam has moved out of its circuit closing position, even though all the "next" relays are deenergized.

It will be observed that car A has not yet left the dispatching floor even though its desired-position disk 45 has started rotating from its first floor position. The rotation of the disk causes its on-time contact segment 61 to leave the first floor brush 91 thus deenergizing the relay E. A slight further rotation of the disk 45 causes its car-behind-time segment 63 to engage the brush 91, thus energizing the car-behind-time relay G for car A by the circuit:

L+3, M6, G, E1, F2, 70, 67, 63, 91, b1, 29, DQ2, L—3

The energized relay G closes its contacts G1, G2, and opens its contacts G3 and G4. The closed contacts G1 complete a circuit for energizing the by-pass relay P for car A, said circuit extending:

L+4, P, PP, G1, L—4

The effect of the energized relay P is to open its contact members P1 (Fig. 4) in the circuit of the stopping relay S for car A to cause that car to by-pass any calls registered at the floor landings until it catches up with its desired-position disk 45.

The closing of the contacts G2 completes a self-holding circuit for relay G.

The opening of the contact members G3 prevents energization of the car-ahead-relay F.

The opening of the contacts G4 in the circuit of the impulse motor 37 inserts the resistor $r3$ in that circuit and thereby causes the impulse motor 37 to decrease its speed in accordance with the condition that car A is now behind the schedule set by its disk 45.

It will be assumed that the attendant on car A starts the car on its up trip by closing the up button 17 in the car. This energizes the up direction switch U to cause the car to move upwardly by the circuit:

L+1, 17, U, S1, 111, L—1

The energized up direction switch U closes its contact members U1, U2, U3 and U4. The closed contacts U1 energize the brake coil 16M to release the brake 16 and permit the upward operation of the car (Fig. 4). The closed contacts U2 and U3 energize the field winding 87F of the generator 87 to operate the hoisting motor 15 for the up direction by the circuit:

L+1, U2, 87F, U3, N1, L—1

The car now leaves the first floor on its upward trip. The closing of the contacts U4 provides a self-holding circuit for the relay U so that the car will not be stopped until its stop relay S is energized.

As the car moves upwardly, the brush 29 on its actual position floor selector moves over the contact segments b1, b2 and b3. As the car catches up with its desired-position disk 45 around the fourth floor, the brush 29 leaves the contact segment b3 and engages the contact segment b4, thus providing a circuit for energizing the car-on-time relay E. This circuit extends:

L+3, M6, E, 68, 65, 61, 94, b4, 29, DQ2, L—3

The energized relay E opens its contact members E1 and E2. The opening of the contact members E2 prevents energization of car-ahead-relay F. The opening of the contacts E1 deenergizes the car-behind-relay G to open its contacts G1 and G2 and closes its contacts G3 and G4. The opening of the contacts G1 deenergizes the by-pass relay P (Fig. 5) which, in turn, closes its contact members P1 (Fig. 4) to permit energization of the stopping relay S of car A thereby restoring that car to its ability to pick up any registered call ahead of it now that it is on time.

The closing of the contact members G4 restores the resistor $r3$ to the circuit of the impulser motor 37 and that motor now returns to its normal constant speed.

It will be assumed that the car continues upwardly and in so doing speeds ahead of its desired-position disk 45 as it comes opposite the sixth floor and thereby causes energization of the car-ahead-relay F to slow down the car motor 15 and also the impulser motor 37. At this sixth floor position of the car, its actual selector brush 29 leaves the contact segment b6 and engages the contact segment b7. The separation of the brush 29 and the segment b6 deenergizes the relay E because the actual position selector is now ahead of the desired-position selector and the circuit for the relay E is broken by the fact that the car-on-time strip 61 is out of contact with the strip brush 96 for the sixth floor. The engagement of the brush 29 with the segment b7 energizes the car-ahead-relay F by the circuit:

L+3, M6, F, G3, E2, 69, 66, 62, 97, b7, 29, DQ2, L—3

The energized relay F closes its contacts F1, F3 and F4 and opens its contacts F2. The closing contacts F1 energize the car slowdown relay N for car A by the circuit:

L+4, N, F1, L—4

The energized relay N closes its self-holding contacts N2 and opens its contacts N1 (Fig. 4) and thereby places the resistor $r1$ in circuit with the field winding 87F of the generator 87, thus causing car A to decrease its speed so that it will not continue to run ahead of its desired position floor selector. The relay N will hold in until the car makes its next stop by reason of the contacts U6 of the up direction switch U, even though the car does slow down to run with its desired position disk 45.

Returning now to relay F, the opening contacts F2 prevent energization of the car-behind-relay G and the closing contacts F3 provide a self-holding circuit for the relay.

The closing of the contacts F4 (Fig. 6) short circuits the resistor $r7$ in the circuit of the impulser motor 37 and thus causes the impulser motor 37 to speed up to run the dispatching system and the scheduling disk more in accord with the actual operation of car A. Here it is seen how the car getting ahead of its schedule causes its hoisting motor to slow down and its desired-position selector motor to speed up, thus causing the car and its disk to run more nearly in line with each other and more in line with the ability of the car to run on the dispatching schedule selected for it. Of course, if another car gets behind its schedule at the same time, its ability to answer floor calls will be removed to speed up its operation and its behind time relay will open its short circuiting contacts in the circuit of the impulser motor thus balancing the effect of the closing of the F4 contacts and causing the impulser motor to continue at its normal speed.

It will be assumed now that the car is close to the upper terminal and is stopped at that floor, either by the usual limit switch (not shown) or by operation of one of the stopping buttons. The stopping of the car stops the operation of the actual position selector 25 and the brush 29 comes to rest on the segment b8. However, the desired-position disk 45 continues its rotation and will continue to rotate until it returns to its first floor position.

As the car arrives at the upper terminal, its upper limit switch 32T is operated by the cam 32 on the car, thus deenergizing the up relay UQ which, in turn, closes its back contact members UQ1, thus energizing the down relay DQ by the circuit:

L+1, DQ, UG1, 32B, U5, L—1

The energized relay DQ opens its contact members DQ2 (Fig. 6) in the circuit to the up brush 29 and said brush will be inactive during the down operation of the car. However, the brush 30 is connected to the line conductor L—3 by the now closed back contacts UQ2 of the up direction relay UQ and the car is ready for its down trip.

While the car stands at its upper terminal, the eighth floor, the desired-position disk 45 continues rotating and its contact strip 62 leaves the strip brush 98 and its strip 61 moves into engagement with the strip brush 98. The engagement of strip 61 and the brush 98 energizes the car-on-time relay E by the circuit:

L+3, M6, E, 68, 65, 61, 98, d8, 30, UQ2, L—3

The energized relay opens its contact members E1 and E2. The opening of the contact members E2 deenergizes the car-ahead-of-time relay which, in turn, opens its front contacts F1, F3 and F4 and closes its back contacts F2. The opening of the contacts F1 deenergizes the slowdown relay N which, in turn, closes its contacts N1, thus shorting the resistor r1 in the circuit of the generator field winding 87F. However, this is ineffective because the car has already stopped at the eighth floor, but it will prevent the car from resuming its slow speed operation when it leaves the eighth floor. The opening of the contact members F4 restores the resistor r1 in the circuit of the impulser motor 37 and thus restores that motor to its normal constant speed.

It will be assumed now that the attendant in car A closes the down button 18 in the car, thereby energizing the down direction switch D to start the car downwardly by the circuit:

L+1, 18, D, S1, 111, L—1

The energized direction switch D closes its contacts D1, D2, D3 and D6 and opens its back contacts D5. The closed contacts D1 energize the brake coil 16M to release the brake 16. The closed contacts D2 and D3 connect the generator field winding 87F for down operation of the car. The closed contacts D4 provide a self-holding circuit for the relay D. The open contact members D5 prevent energization of the up direction relay UQ while the car is moving down. The closed contact members D6 prepare the self-holding circuit of the slowdown relay N for completion under certain conditions.

As the car leaves the eighth floor and moves downwardly, the brush 30 moves downwardly and successively engages the contact segments d8, d7 and d6. As the brush 30 leaves the segment d6. the car is getting ahead of the desired-position disk 45. Hence the car-on-time relay E is deenergized because the circuit through the on-time segment 61 has been opened. However, as the brush 30 engages the contact segment d5, it completes a circuit for energizing the car-ahead-of-time relay F which extends:

L+3, M6, F, G3, E2, 69, 66, 62, 105, d5, 30, UQ2, L—3

The energized relay F closes its front contacts F1, F3 and F4 and opens its back contacts F2. The closed contacts F4 short circuit the resistor r7 in the circuit of the impulser motor 37 thus increasing the constant speed of that motor to a higher level, more in keeping with the higher speed of the car. The closing contacts F1 energize the slowdown relay N for car A as previously described, which, in turn, closes its self-holding contacts N2 and opens its back contacts N1 to insert the resistor r1 in the circuit of the generator field winding 87F to slow down the car and thus tend to keep its speed more in line with its scheduling disk 45.

As the car slows down during its down run while it is passing the fourth floor, the contact segment 62 leaves the brush 104 and the segment 61 engages the brush 104. The engagement of the segment 61 and the brush 104 energizes the car-on-time relay E which, in turn, opens its contact members E2 thus deenergizing the car-ahead-of-time relay F, which now opens its contact members F4 to return the resistor r7 to its normal operation in the field of the impulser motor 37, which restores that motor to its normal constant speed. The deenergized relay F also opens its contact members F1 in the circuit of the slow-down relay N but that relay remains energized and will remain energized until the car is stopped because relay N has a self-holding circuit controlled only by the direction switches on the car.

It will be assumed now that the car is stopped at the third floor. This causes the slowdown relay N to be deenergized because of the opening of the contacts D6 belonging to the down direction switch. While the car is stopped at the third floor, the desired-position disk 45 is continuing its rotation. This continued rotation causes the contact strip 61 to leave the strip brush 103 thereby opening the circuit for the car-on-time relay E and deenergizing it. The continued rotation of the disk 45 causes its segment 63 to engage the brush 103 thereby energizing the car-behind-time relay G by the circuit:

L+3, M6, G, E1, F2, 70, 67, 63, 103, d3, 30, UQ2, L—3

The energized relay G closes its front contacts G1 and G2 and opens its back contacts G3 and G4. The opening of the contacts G4 in the circuit of the impulser motor 37 slows down that motor because the car is behind time. The closing of the contacts G1 energizes the by-pass relay P which, in turn, opens its contacts P1 in the circuit of the stopping relay S for car A and thereby prevents car A from answering any registered stop calls at the floor landings until it ceases to be behind time.

At this time, it will be assumed that the disk 45 has continued its rotation and has returned to its first floor position where its further rotation is stopped by the stopping arm 56 engaging the stopping plate 55. The stopping arm overcomes the friction of the clutch plate 50 against the disk 45 and causes the disk to remain in its dispatching floor position until car A gets its next dispatching signal. Although the desired-position disk has run on into its first floor position, the car A is still at the third floor and behind time.

It will be assumed now that the attendant on the car closes the down switch 18 in the car, thus energizing the down direction switch D to cause the car to start downwardly as previously described.

Inasmuch as the slowdown relay N has been rendered ineffective by the stopping of the car, the car starts at normal speed. As the car approaches the lower terminal, the brush 30 on its actual position selector leaves the contact segment $d2$ for the second floor and engages the contact segment $d1$ for the first floor. The engagement of the brush 30 and the contact $d1$ completes the circuit for energizing the on-time relay E which thereupon opens its contact members E1 to deenergize the car-behind-time relay G. The deenergized relay G closes its back contacts G4 in the circuit of the impulser motor 47 thus causing that motor to speed up to its normal speed and also closes its contacts G1, thus deenergizing the by-pass relay P which restores car A to its normal ability to pick up stop calls at the floor landings.

As car A moves into the first floor landing, its cam 32 engages the bottom limit switch 32B and thereby opens its contacts to deenergize the down relay DQ which, in turn, closes its back contact members DQ1, thus energizing the up direction relay UQ ready for up operation of the car A when it again receives a dispatching signal to leave the dispatching floor.

The car A has been given a complete cycle of operation and it will be assumed that while car A was being operated, the sequence motor 89 was energized by the closing of the contacts V1 to move the contact arm 90 in clockwise direction from its position just beyond the segment 108, into engagement with the contact segment B108 for car B, thus energizing the "next" relay BX to cause the giving of a "next" signal to car B. The circuit for relay BX extends:

L+5, M1, X2, BX2, CX2, DX2, V1, 110,
99, B108, BX, BT4, L—5

The energized relay BX closes its self-holding contacts BX2 and opens its contacts BX2 to stop the sequence motor 89 which drifts a short distance after being stopped so that the contact arm 90 leaves the contact segment B108 and comes to rest between the segments B108 and C108.

The energization of the relay BX also closes its contact members BX3, thereby energizing the first floor lantern B1FL for car B to indicate to the waiting passengers that car B will now be the next one to leave and also lighting the "next" lamp BNL in car B to advise the attendant that his car will be the "next" car to receive the dispatching signal.

In the meantime, the impulser motor 37 has turned the impulser drum to a position where the cam 76 engages the brushes 77. This energizes the dispatching relay BK and the disk-releasing relay BL for car B by the circuit extending:

L+3, M9, 22, 3, 77, 76, C59, C57, CT2,
BX4, B60, B58, BT4, BK, BL, L—3

The energized relay BL withdraws the stopping arm B56 to release the disk B45 and it is rotated by the clutch B59 and the shaft 36 to indicate the desired schedule for car B. The energized relay BK causes operation of the buzzer BZ in car B to indicate that the attendant should start on his trip and also energizes the lamp B24 on the dispatcher panel 29 to indicate to the dispatcher attendant that car B has received its dispatching signal. The energization of the relay BK also closes its contacts BK1 which energize the cancellation coil BXO to deenergize the "next" relay BX which, in turn, opens its contact members BX3 to deenergize the first floor lantern B1FL for car B and also deenergize the "next" lamp BNL in car B. The deenergized "next" relay BX also opens its contacts BX4 to deenergize the relays BK and BL.

The car B now leaves the dispatching floor, following its scheduling disk, and it will be assumed that it operates in the same manner as the assumed operation of car A. It will also be assumed that, after the scheduling disk 45 for car A returns to the dispatching floor, car C is given a dispatching signal and that its scheduling disk C45 is started in rotation. Thus the cars are given "next" signals and "start" signals and are kept moving in accordance with the operation of the scheduling disks and the dispatching system.

The foregoing has been mainly descriptive of the action of only car A. It is believed to be obvious, however, that a plurality of cars when operated simultaneously will operate with each car following the motion of its desired-position selector and will keep its "on time," "behind time" and "ahead of time" relays operated to affect the operation of the car and the scheduling and dispatching motor in accordance with the ability of the car to follow its schedule. With a plurality of cars operating, each "behind time" car will slow down the speed of the scheduling and dispatching motor through the action of the resistors in its circuit. The action will be gradual. One car, when it is behind time, will have only a slight slowing down effect on the desired-position disks of the other cars. However, if all of the cars become behind-time cars, the speed of the motor 37 will be proportionately decreased, thereby giving a much greater slowing down of the desired-position disks in a given period of time.

If the round trip time of all the desired-position disks is lengthened, the round trip time of the impulser motor 37 will also be lengthened. Therefore, the cars will be dispatched from the dispatching floor at longer and longer intervals. Consequently, a number of cars being "behind time" will result in a slower round trip time of all of the desired-position disks and in a longer dispatching interval.

On the other hand, if the cars consistently run ahead of time, they will cause their ahead of time relays to be operated to effect a decrease in the speed of the cars and an increase in the speed of the dispatching and scheduling motor. This will effect the speeding up of the dispatching means and also the desired-position disks so that the scheduled round trip time of the cars will be increased and the speed of the impulser will be increased to give the dispatching signals at more frequent intervals thus operating the system as a whole in conformity with the ability of the cars to keep up with their desired-position selectors.

Inasmuch as the ability of the cars to keep in step with their schedules is determined by the number of stop calls registered by the passengers, it is evident that the system will cause the cars to be operated in accordance with the amount of traffic they serve.

By the foregoing description, it will be seen how the cooperation of the actual position selectors and the desired-position selectors effects the energization and deenergization of the on-time relays, ahead-of-time relays and behind-time relays of the cars to cause the dispatching and scheduling motor to operate at speeds appropriate to the ability of the cars to keep up with their desired schedules and also to slow down the cars when they start running ahead of their schedules and to cause the cars behind their schedules to by-pass floor calls until they catch up with their schedules. It will also be evident that inasmuch as each car getting behind or ahead of its schedule has a corrective effect on the dispatching and scheduling system, the total sum of such effects will be to cause the dispatching and scheduling system to operate in the most efficient manner. It will also be evident that the by-pass pushbuttons in the cars will enable the attendants to use their judgment in overcoming the by-passing of their cars whenever they see fit to do so.

It will also be obvious from the foregoing description that my improved system provides a dispatching and scheduling means for elevator systems which will cause the cars to keep within desired predetermined schedules and which will automatically adjust itself to inequalities in the operation of the system.

Description of Fig. 7

The modified arrangement of scheduling relay circuits shown in Fig. 7 may be substituted for the scheduling relay circuits given in Fig. 6. In this modification, two car-on-time relays designated as E and E' are used for car A instead of only the one on-time relay E. An additional contact ring 65a is mounted on the desired-position disk of car A to be engaged by an additional on-time brush 68a which is electrically connected to the additional on-time relay E'. The other cars are provided with similar additional relays and contact rings. Additional resistor sections $r11$, $r12$, and $r13$ for decreasing the speed of the motor 37 are disposed in the circuit for the armature 37A to be controlled by back contacts E4, BE4, and CE4 on the on-time relays E, BE, and CE. Additional resistor sections $r14$, $r15$, and $r16$ for increasing the speed of the motor 37 are also included in the circuit of the armature 37A to be controlled by front contacts E'4, BE'4, and CE'4 of the additional on-time relays E', BE' and CE'. Otherwise, the modified system of scheduling relays works the same as the system in Fig. 6.

The additional on-time resistors $r11$, $r12$, and $r13$ controlled by the back contact members on the on-time relays E, BE and CE and the additional resistors controlled by the additional on-time relays E', BE' and CE' provide a more gradual series of speed changes for the motor 37 than may be obtained with resistors controlled only by the ahead-of-time relays and the behind-time relays shown in Fig. 6.

Description of Fig. 8

The modified system of circuits for the dispatching relays K, BK, and CK and the disk releasing relays L, BL, and CL shown in Fig. 8 may be substituted for the circuits for these relays shown in the lower part of Fig. 6. In this modified system the interlocking contacts of the car-in-service relays are eliminated and only one contact segment (57, B57, C57, etc.) of each desired position disk is used.

Furthermore, in this modified system the setting numerals on the switch 22 (Fig. 3) will be arranged for the exact number of active cars in the system instead of for a number one less than the number of active cars, because in this system each car is dispatched right after it arrives at the dispatching floor.

In considering Fig. 8, it will be assumed that the three cars A, B, and C are in service and that the dispatching attendant sets the switch 22 at the numeral 3 to prepare the system for operating the three cars.

It will be assumed further that the three cars A, B, and C are standing at the dispatching floor and that the sequence arm 90 is in the position shown in Fig. 5 when the dispatching attendant starts the dispatching system in operation. It will be assumed also that no drum cam on the impulser is in contact with its impulse brushes.

Inasmuch as no drum cam is on its impulse brushes, the relay V is deenergized and its back contacts V1 are closed, thus energizing the sequence motor 89 to rotate the sequence arm 90 into engagement with the sequence segment 108 (Fig. 5), thus energizing the "next" relay X to close its contacts X1, X3, and X4 and open its contacts X2. The opening contacts X1 provide a self-holding circuit for relay X. The closing contacts X3 light the first floor lantern 1FL and the "next" lamp NL for car A. The closed contacts X4 prepare the circuits of the relay K and L for operation.

Assuming now that the impulser drum moves the cam 78 into contact with its brushes 81, this energizes the relays K and L by the circuit:

L+7, 22, 3, 81, 78, X4, 59, 57, K, L, T4, L—7

The energized relay L lifts the stopping arm 56, thereby releasing the scheduling disk 45 for car A and that disk starts rotation for scheduling car A on its trip.

The energized relay K closes its self-holding contacts K3 and also closes contacts K1 for energizing the cancellation coil X0 to deenergize the "next" relay X, which in turn opens its contact members X3 to extinguish its first floor lantern and its "next" lamp NL. The relay X also opens its contact members X4 in the circuit of the relay K but that relay will remain energized, by reason of its self-holding contacts K3 until the cam 78 leaves the brushes 81.

The energized relay K also closes its contacts K2, thereby operating the buzzer Z for car A to tell the attendant to start on his "next" trip and lights the lamp 24 on the dispatching panel to tell the dispatching attendant that car A has received its dispatching signal. Car A now leaves the first floor in response to its dispatching signal, and the continued rotation of the impulser drum carries the cam 78 beyond the brushes 81 and thereby deenergizes the relays K and L.

The separation of the cam 78 and brushes 81 also deenergizes the relay V which closes its back contacts V1 and thereby causes the sequence motor 89 to rotate the sequence arm 90 into engagement with the sequence segment B108 for car B, thus energizing the "next" relay BX for car B. The giving of the "next" signal to car B is carried out in the same manner as for car A and when the continued rotation of the impulser drum carries the cam 78 into contact with its brushes 81, the relays BK and BL for car B will be energized to cancel the "next" signal for that car and give it its dispatching signal to leave on its "next" trip.

If no car is at the floor when the sequence motor picks up the "next" relay for a car, that relay will light the "next" lamp for the "next" car even though the car has not yet arrived at the dispatching floor. This will inform the attendant in that car that he will be "next" to leave the dispatching floor and also indicate to him that he is behind time. As soon as the scheduling disk for that car rotates into its dispatching floor position, its segment 57 will cooperate with the corresponding drum cam to energize the dispatching relay and the disk-releasing relay for that car. The energization of these relays will release the scheduling disk for the car and operate the dispatching buzzer in the car even though the car itself has not yet arrived at the dispatching floor. The operation of the buzzer in the car will inform the attendant therein that he should leave the dispatching floor as soon as possible after arriving thereat.

The modified system of circuits for the K and L relays eliminates the feature of the original system by which it was necessary to have two dispatching disks in the first floor position in order to have the earlier of the two cars thereof receive a dispatching signal. If there are several cars at the floor, waiting for a dispatching signal, one car will receive its signal as each dispatching impulse is given. When all the desired-position disks have left the first floor position, the sequence motor will run to the position which corresponds to the next car which is scheduled to arrive at the first floor position. At this point the "next" relay corresponding to that car will become energized and will lock itself in. It will then stay in this position until the desired-position disk for that car arrives at the first floor position. This will occur at the same time as the dispatching drum cam engages its brushes to give a dispatching signal. This is so, because the dispatching drum cams are driven by the same motor that drives the desired-position disks. A desired-position disk is released each time a dispatching impulse is given and the two will then travel together around a path corresponding to the round trip of the car and will arrive back in the first floor position simultaneously. Thus the device will consign one position disk to each dispatching impulse cam and the system will travel around in this order.

The modifications disclosed in Figs. 7 and 8 are provided because there may be some installations in which they will suit the existing requirements as well as or better than the arrangements shown in Fig. 6. The modifications are also shown for the purposes of illustrating the flexibility of my improved system and as examples as to how it may be modified for various installations.

Although I have illustrated and described only one main embodiment of my invention and two modifications of parts thereof, it is to be understood that many changes therein and modifications thereof may be made without departing from the spirit and scope of the invention.

I claim as my invention:

1. In an elevator system for operating a plurality of cars serving a plurality of floors, a control means individual to each car for starting and stopping it, a switch at each floor for registering stop calls for service at that floor, a dispatching means for giving starting signals to the cars at predetermined intervals of time, a scheduling device for each car operable in accordance with the desired position of that car, an actual position device for each car operable in accordance with the actual position of that car, means responsive to the relative position of the scheduling device and the actual position device of any car ahead of its schedule for operating the control means of that car to slow it down and for increasing the speed of the dispatching means and the scheduling devices for all the cars, a preventing means responsive to the relative position of the scheduling device and the actual position device of any car when that car is behind time for operating the control system of that car to prevent it from stopping at a floor in response to an operated switch at that floor, means in each car which may be operated by the attendant therein to render said preventing means ineffective, means responsive to operation of the dispatching means for stopping the scheduling device of each car when it arrives at the dispatching floor, means responsive to operation of the dispatching means for causing the scheduling device of a car to start its scheduled operation when the car is given its start signal, and means responsive to operation of the scheduling devices for preventing the dispatching means from giving a starting signal to a car when the scheduling device of that car is not in its dispatching floor position.

2. In an elevator system for operating a plurality of cars serving a plurality of floors, a control means individual to each car for starting and stopping it, a switch at each floor for registering stop calls for service at that floor, a dispatching means for giving starting signals to the cars at predetermined intervals of time, a scheduling device for each car operable in accordance with the desired position of that car, an actual position device for each car operable in accordance with the actual position of that car, means responsive to the relative position of the scheduling device and the actual position device of any car ahead of its schedule for operating the control means of that car to slow it down and for increasing the speed of the dispatching means and the scheduling devices for all the cars, a preventing means responsive to the relative position of the scheduling device and the actual position device of any car when that car is behind time for operating the control system of that car to prevent it from stopping at a floor in response to an operated switch at that floor, means in each car which may be operated by the attendant therein to render said preventing means ineffective, means responsive to operation of the dispatching means for stopping the scheduling device of each car when it arrives at the dispatching floor, and means responsive to operation of the dispatching means for causing the scheduling device of a car to start its scheduled operation when the car is given its start signal.

3. In an elevator system for operating a plurality of cars serving a plurality of floors, a control means individual to each car for starting and stopping it, a switch at each floor for registering stop calls for service at that floor, a dispatching means for giving starting signals to the cars at predetermined intervals of time, a scheduling device for each car operable in accordance with the desired position of that car, an actual position device for each car operable in accordance with the actual position of that car, means responsive to the relative position of the scheduling device and the actual position device of any car ahead of its schedule for operating the control means of that car to slow it down and for increasing the speed of the dispatching means and the scheduling devices for all the cars, a preventing means responsive to the relative position of the scheduling device and the actual position device of any car when that car is behind time for operating the control system of that car to prevent it from stopping at a floor in response to an operated switch at that floor, means in each car which may be operated by the attendant therein to render said preventing means ineffective, and means responsive to operation of the dispatching means for stopping the scheduling device of each car when it arrives at the dispatching floor.

4. In an elevator system for operating a plurality of cars serving a plurality of floors, a control means individual to each car for starting and stopping it, a switch at each floor for registering stop calls for service at that floor, a dispatching means for giving starting signals to the cars at predetermined intervals of time, a scheduling device for each car operable in accordance with the desired position of that car, an actual position device for each car operable in accordance with the actual position of that car, means responsive to the relative position of the scheduling device and the actual position device of any car ahead of its schedule for operating the control means of that car to slow it down and for increasing the speed of the dispatching means and the scheduling devices for all the cars, a preventing means responsive to the relative position of the scheduling device and the actual position device of any car when that car is behind time for operating the control system of that car to prevent it from stopping at a floor in response to an operated switch at that floor, and means in each car which may be operated by the attendant therein to render said preventing means ineffective.

5. In an elevator system for operating a plurality of cars serving a plurality of floors, a control means individual to each car for starting and stopping it, a switch at each floor for registering stop calls for service at that floor, a dispatching means for giving starting signals to the cars at predetermined intervals of time, a scheduling device for each car operable in accordance with the desired position of that car, an actual position device for each car operable in accordance with the actual position of that car, means responsive to the relative position of the scheduling device and the actual position device of any car ahead of its schedule for operating the control means of that car to slow it down and for increasing the speed of the dispatching means and the scheduling devices for all the cars, and a preventing means responsive to the relative position of the scheduling device and the actual position device of any car when that car is behind time for operating the control system of that car to prevent it from stopping at a floor in response to an operated switch at that floor.

6. In an elevator system for operating a plurality of cars serving a plurality of floors, a control means individual to each car for starting and stopping it, a switch at each floor for registering stop calls for service at that floor, a dispatching means for giving starting signals to the cars at predetermined intervals of time, a scheduling device for each car operable in accordance with the desired position of that car, an actual position device for each car operable in accordance with the actual position of that car, and means responsive to the relative position of the scheduling device and the actual position device of any car ahead of its schedule for operating the control means of that car to slow it down and for increasing the speed of the dispatching means and the scheduling devices for all the cars.

7. In a control system for an elevator car serving a plurality of floors, means for operating the car past the floors, an independent moving member, and means responsive to the actual position of the car with reference to said moving member for changing the speed of operation of the car.

8. In a control system for an elevator car operable past a plurality of floors; a circuit for causing said car to run at a normal high speed, a circuit for causing said car to run at a speed less than said normal high speed, an independent moving member; and means responsive to the relative position of the car with respect to said moving member for rendering said normal speed circuit ineffective and for rendering effective said less than normal speed circuit.

9. In an elevator system for operating a car serving a plurality of floors, the combination of means for operating the car past the floors, a scheduling selector operable in accordance with the desired position of the car during its operation, an actual position selector operable in accordance with the actual position of the car, and means responsive to relative movement of the scheduling selector and the actual position selector for slowing down the operation of the car when it runs ahead of the position it should be in accordance to the operation of its scheduling selector.

10. In an elevator system for a car serving a plurality of floors, a power system for operating the car past the floors, said power system including a generator having a field winding and an armature, a circuit for the field winding, a desired-position scheduling device, and means responsive to the relative position of the car with respect to the said scheduling device for controlling the field winding circuit to change the speed of the car.

11. In a control system for an elevator car operable past a plurality of floors; a switch at each floor for registering calls for service; means responsive to operation of a call switch for causing the car to stop at the associated floor; an independent moving member; and means responsive to the relative position of the car with respect to said moving member for preventing said car stopping means from stopping said car in response to a call registered by a floor switch and for causing said independent moving member to move slower.

12. In a control system for an elevator car operable past a plurality of floors, a switch at each floor for registering stop calls for service, a floor selector, a scheduling device, means responsive to operation of the floor selector and the scheduling device when the car falls behind the schedule set up for it by the scheduling device for preventing the car from answering a stop call registered by a floor switch, and means disposed in the car by which the attendant on the car may render ineffective the said means for preventing the car from answering a stop call registered by a floor switch.

13. In an elevator system for operating a car serving a plurality of floors, means for operating the car past the floors, a dispatcher for giving the car starting signals at predetermined intervals, a device for scheduling the desired position of the car, an actual position floor selector, a motor for operating the dispatcher and the scheduling device in synchronism, and means responsive to the operation of the actual position floor selector and the scheduling device when the car is ahead of its schedule for causing the car operating means to modify the speed of the car and for varying the speed of the dispatcher and the scheduling device motor.

14. In a scheduling mechanism for giving starting signals to a plurality of elevator cars serving a plurality of floors; a timing device for effecting the giving of the starting signals at any of a plurality of rates; a control circuit for each of said cars for causing said car to run at either of two predetermined speeds; a scheduling device for each car operable in accordance with any one of a plurality of predetermined schedules for defining the position at which that car should be; an actual position floor selector for each of said cars; and means operable by the scheduling device and the actual position floor selector for one of said cars for causing said car to run at a slower speed and for causing the start signals for all of the cars to be given at a faster rate and for causing the scheduling devices for all of the cars to operate at a faster schedule while the position at which said car should be is behind the actual position of said car.

15. In a control system for a plurality of elevator cars operable past a plurality of floors at a normal high speed, a dispatcher for giving signals at intervals to the cars, a timing device for effecting the giving of starting impulses at any of a plurality of rates; a schedule determining member associated with each car moving independently of the motion of the associated car; a member for each car moving in accordance with the motion of the associated car; means responsive to the said second named member of any one of the cars being relatively ahead of the associated first member for that car for causing the associated car to proceed at less than normal speed, and to cause said timing device to give starting impulses at a faster rate.

16. In a control system for a plurality of elevators cars serving a plurality of floors, a scheduling mechanism for the cars comprising a frame, a shaft rotatably mounted in the frame, a motor for driving the shaft, a scheduling device for each car, each device comprising a ring fixed to the frame concentric with the shaft, a disk rotatably mounted on the shaft within the ring, a clutch mounted on the shaft to engage the disk and cause it to rotate with the shaft, and an arm disposed to engage the disk and stop it at a predetermined point.

17. An impulsing and scheduling mechanism for an elevator system comprising a frame, a shaft rotatably mounted in the frame, a motor for rotating the shaft, an impulser drum fixed on the shaft to rotate therewith and provided with a plurality of cams for closing a plurality of circuits, and a scheduling device for each of the cars in the system, each scheduling device comprising a ring disposed concentric with the shaft and fixed to the frame, a disk rotatably mounted on the shaft in position to rotate within the ring, a clutch for frictionally engaging the disk to cause it to rotate with the shaft, an arm for engaging the disk when it reaches a predetermined point and prevent its rotation under the action of its friction clutch, and means for withdrawing the arm to permit the clutch to rotate with the shaft under the action of its friction clutch.

18. A scheduling mechanism for an elevator system comprising a frame, a shaft rotatably mounted in the frame, a motor for rotating the shaft; a scheduling device for each car in the system, each scheduling device comprising a ring seated in the frame and disposed concentric with the shaft, a disk rotatably mounted on the shaft in position to rotate within the ring, a frictional clutch for engaging the disk and causing it to rotate with the shaft, an arm for stopping the rotation of the disk by the friction clutch when the disk reaches a predetermined point, means for withdrawing the arm to permit the disk to rotate under the action of the friction clutch, a plurality of contact strips mounted on the periphery of the disk, a plurality of strip brushes mounted on the ring in position to wipe the contact strips as the disk is rotated, a plurality of contact rings mounted on the disk and electrically connected to the contact strips, and a plurality of ring brushes mounted on the frame in position to engage the contact rings for completing electrical circuits through the strip brushes and the contact strips.

19. In an elevator system, a scheduling and dispatching mechanism comprising a frame, a shaft rotatably mounted in the frame, a motor for rotating the shaft; a plurality of scheduling devices, one for each car, each scheduling device comprising a ring disposed concentric with the shaft and seated on the frame, a disk rotatably mounted on the shaft to rotate within the ring, a friction clutch mounted on the shaft for engaging the disk and causing it to rotate with the shaft, and an arm for stopping the disk when it rotates to the point, and a relay for causing the arm to release the disk; and a dispatching mechanism comprising an impulser fixed to the shaft to rotate therewith, a plurality of cams mounted on the impulser, a plurality of cam brushes mounted on the frame in position to be wiped by the cams as the impulser is rotated for giving dispatching impulses, a plurality of starting relays, one for each car, for causing the giving of starting signals to the cars, means for selecting the car to be given the next starting signal, and means for simultaneously operating the dispatching relay of said car and the arm releasing relay of that car to give it a dispatching signal and start its scheduling device in operation.

20. In an elevator system for operating a plurality of cars serving a plurality of floors, a scheduling device for each car operable in accordance with the desired position of that car, a dispatching mechanism for giving start signals to the cars at predetermined intervals, and means responsive to operation of the dispatching system for effecting the starting of the scheduling device of a car when that car receives its start signal.

21. In an elevator system for operating a plurality of cars serving a plurality of floors including a dispatching floor, a scheduling device for each car operable in accordance with the desired position of that car, a dispatching mechanism for giving start signals to the cars at a dispatching floor at predetermined intervals, means responsive to operation of the dispatching mechanism for stopping each of the scheduling devices when it moves into its dispatching floor position, and means responsive to operation of the dispatching means to give a start signal to a car for starting the scheduling device of that car into operation when it receives its start signal.

22. In an elevator system for operating a plurality of cars serving a plurality of floors including a dispatching floor, a scheduling device for each car operable in accordance with the desired position of that car, a dispatching means for dispatching the cars from the dispatching floor, means responsive to operation of the dispatching means for starting the scheduling device of a car from its dispatching floor position when its car is to be started from the dispatching floor, and means responsive to further operation of the dispatching means for stopping the scheduling device when it returns to its dispatching floor position.

23. In an elevator system for operating a plurality of cars serving a plurality of floors, including a dispatching floor, a dispatching mechanism for giving starting signals to the cars at predetermined intervals at the dispatching floor, a scheduling device for each car operable in accordance with the desired position of that car, means for stopping the scheduling devices when they move into dispatching floor position, and means responsive to the operation of the dispatching mechanism and the presence of two scheduling devices in dispatching floor position for giving a starting signal to a car and for starting the scheduling device of that car to schedule the desired position therefor.

24. In an elevator system for operating a plurality of cars serving a plurality of floors, including a dispatching floor, a scheduling device for each car operable in accordance with the desired position of that car, means for stopping each of the scheduling devices as it moves into its dispatching floor position, means for giving a dispatching signal to the next car which should leave the dispatching floor, and means for preventing the giving of said dispatching signal until the scheduling device for the car to receive the dispatching signal and the scheduling device for the next following car are in dispatching floor position.

25. In an elevator system for operating a plurality of cars serving a plurality of floors including a dispatching floor, a dispatching mechanism comprising means for selecting a car to be next to receive a dispatching signal and for giving that selected car a dispatching signal when it should leave the dispatching floor, a scheduling device for each car operable in accordance with the desired position of that car, and means for causing the dispatching mechanism to give the selected car a dispatching signal, said means requiring the presence at the dispatching floor of the scheduling device for the car to receive the dispatching signal and also the scheduling device of the next following car.

26. In an elevator system for operating a plurality of cars serving a plurality of floors including a dispatching floor, a scheduling device for each car for scheduling the desired position of that car, a "start" signal device for each car, a dispatching mechanism operating the "start" signal devices, means for stopping the scheduling devices at the dispatching floor, means responsive to the operation of the dispatching mechanism for operating the signal device of a car to give it a starting signal, and means responsive to operation of the scheduling devices for preventing the dispatching mechanism from operating the "start" signal device of a car when the scheduling device for that car is not in its dispatching floor position.

27. In a control system for a plurality of elevator cars operable past a plurality of floors; a switch at each floor for registering calls for service; means associated with each car responsive to operation of a call switch for causing the associated car to stop at the associated floor; a plurality of independent moving members, one associated with each car, and motive means common to said members for moving each in a predetermined path; and means responsive to the relative position of an elevator moving in its shaftway with respect to the associated independent moving member moving in its path for preventing said car from stopping at a floor whose switch has been operated, and for decreasing the speed of the motive means of said independent moving members.

28. In a control system for a plurality of elevator cars past a plurality of floors; a switch at each floor for registering calls for service; means associated with each car responsive to operation of a call switch for causing the associated car to stop at the associated floor; a plurality of independent moving members, one associated with each car, and motive means common to said members for moving them; schedule adjusting means responsive to one relative position of any car and its associated moving member for preventing said car stopping at a floor whose switch has been operated and for slowing down said motive means, and means responsive to another change in relative position of said independent moving member and that of the associated car for causing the schedule adjusting means to become ineffective to prevent stopping of the car and for slowing down the said motive means.

29. In a dispatching mechanism for a plurality of elevator cars operable past a plurality of floors; a timing mechanism for giving dispatching signals to said elevator cars at intervals; a moving member for each car; motive means for operating said timing mechanism and said moving members; position means for each car moving in accordance with the movements of the associated car; and means responsive to the relative position of a moving member for any car and the position means of the associated car for altering the speed of said motive means, to thereby alter the timing interval between dispatching signals.

30. In a dispatching mechanism for a plurality of elevator cars operable past a plurality of floors; a stopping switch at each floor common to the cars; stopping mechanism for each car responsive to operated stop switches to stop the associated car at the associated floors; a timing mechanism for giving dispatching signals to said elevator cars at intervals; a moving member for each car; motive means for operating said timing mechanism and for moving said moving members; position means for each car moving in accordance with the movements of the associated car; and means responsive to the relative position of a moving member for any car and the position means of that car when it gets behind schedule for rendering the stopping means of said car ineffective and for slowing down said motive means to thereby increase the timing interval between dispatching signals.

31. In a dispatching mechanism for a plurality of elevator cars operable past a plurality of floors; a timing mechanism for giving dispatching signals at intervals to said cars; a moving member for each car; motive means for operating said timing mechanism and said moving members; position means for each car moving in accordance with the movements of the associated car; and means responsive to the relative position of a moving member for any car and the position means of that car when it gets ahead of schedule for decreasing the speed of movement of said car and for speeding up said motive means to thereby decrease the timing interval between dispatching signals.

32. In a control system for a plurality of elevator cars operable past a plurality of floors at a normal high speed; a moving member for each car and motive means for moving said members; position means for each car moving in accordance with car movements in cooperative relation with the associated moving member; means responsive to the relative position of said moving member and said position member for any one car when it is ahead of schedule for decreasing the speed of said car below normal and for increasing the speed of said motive means to thereby increase the speed of all said moving members.

WILLIAM L. SEARLES.